US012008323B2

(12) United States Patent
Carbune et al.

(10) Patent No.: US 12,008,323 B2
(45) Date of Patent: *Jun. 11, 2024

(54) GENERATING AND PROVISIONING OF ADDITIONAL CONTENT FOR SOURCE PERSPECTIVE(S) OF A DOCUMENT

(71) Applicant: GOOGLE LLC, Mountain View, CA (US)

(72) Inventors: Victor Carbune, Zurich (CH); Thomas Deselaers, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 17/728,531

(22) Filed: Apr. 25, 2022

(65) Prior Publication Data
US 2022/0245332 A1 Aug. 4, 2022

Related U.S. Application Data

(63) Continuation of application No. 16/730,377, filed on Dec. 30, 2019, now Pat. No. 11,314,930, which is a
(Continued)

(51) Int. Cl.
*G06F 40/30* (2020.01)
*G06F 16/93* (2019.01)
(Continued)

(52) U.S. Cl.
CPC .............. *G06F 40/30* (2020.01); *G06F 16/93* (2019.01); *G06F 40/169* (2020.01); *G06F 40/20* (2020.01);
(Continued)

(58) Field of Classification Search
None
See application file for complete search history.

(56) References Cited

U.S. PATENT DOCUMENTS 8,516,374 B2 8/2013 Fleischman et al.
8,924,436 B1 12/2014 Fortuna et al.
(Continued)

FOREIGN PATENT DOCUMENTS

CN 101344890 1/2009
CN 102741808 10/2012
(Continued)

OTHER PUBLICATIONS

Holtzman NS, Schott JP, Jones MN, Balota DA, Yarkoni T. Exploring media bias with semantic analysis tools: Validation of the Contrast Analysis of Semantic Similarity (CASS). Behavior Research Methods. Mar. 2011;43:193-200. (Year: 2011).*
(Continued)

*Primary Examiner* — Emily C Terrell
*Assistant Examiner* — Nathan J Bloom
(74) *Attorney, Agent, or Firm* — Gray Ice Higdon

(57) ABSTRACT

Implementations described herein determine, for a given document generated by a given source, one or more portions of content (e.g., phrase(s), image(s), paragraph(s), etc.) of the given document that may be influenced by a source perspective of the given source. Further, implementations determine one or more additional resources that are related to the given source and that are related to the portion(s) of content of the given document. Yet further, implementations utilize the additional resource(s) to determine additional content that provides context for the portion(s) that may be influenced by a source perspective. A relationship, between the additional resource(s) and the portions of the given document, can be defined. Based on the relationship being defined, the additional content can be caused to be rendered at a client device in response to the client device accessing the given document.

21 Claims, 9 Drawing Sheets

Related U.S. Application Data continuation-in-part of application No. 16/272,610, filed on Feb. 11, 2019, now Pat. No. 10,521,655.

(51) Int. Cl.
*G06F 40/169* (2020.01)
*G06F 40/20* (2020.01)
*G06F 40/216* (2020.01)
*G06F 40/284* (2020.01)
*G06F 40/295* (2020.01)
*G06N 3/042* (2023.01)

(52) U.S. Cl.
CPC .......... *G06F 40/216* (2020.01); *G06F 40/284* (2020.01); *G06F 40/295* (2020.01); *G06N 3/042* (2023.01)

(56) References Cited

U.S. PATENT DOCUMENTS

| | | |
|---|---|---|
| 9,092,514 B2 | 7/2015 | Cardie et al. |
| 9,285,973 B1 | 3/2016 | Gable |
| 9,860,337 B1 | 1/2018 | Brown et al. |
| 9,990,358 B2 | 6/2018 | Myslinski |
| 10,521,655 B1 | 12/2019 | Carbune et al. |
| 2006/0200341 A1* | 9/2006 | Corston-Oliver ..... G06F 40/253 707/E17.09 |
| 2009/0281978 A1 | 11/2009 | Gordon et al. |
| 2011/0106819 A1 | 5/2011 | Brown et al. |
| 2013/0198196 A1 | 8/2013 | Myslinski |
| 2014/0079297 A1 | 3/2014 | Tadayon et al. |
| 2014/0173425 A1 | 6/2014 | Hailpern et al. |
| 2014/0281877 A1 | 9/2014 | Burge et al. |
| 2014/0363057 A1 | 12/2014 | Eckel |
| 2015/0089409 A1 | 3/2015 | Asseily et al. |
| 2015/0278195 A1* | 10/2015 | Yang ....................... G06F 40/30 704/9 |
| 2015/0331563 A1* | 11/2015 | Chowdhury .......... G06F 40/258 715/765 |
| 2016/0004413 A1* | 1/2016 | Leydon ............... G07F 17/3244 715/838 |
| 2016/0070742 A1 | 3/2016 | Myslinski |
| 2016/0224803 A1 | 8/2016 | Frank et al. |
| 2016/0379515 A1 | 12/2016 | Okubo et al. |
| 2017/0011026 A1* | 1/2017 | Byron ...................... G06N 7/01 |
| 2018/0018316 A1 | 1/2018 | Bogdan et al. |
| 2018/0113855 A1 | 4/2018 | Bostick et al. |
| 2018/0173682 A1 | 6/2018 | Yoo |
| 2020/0004770 A1* | 1/2020 | Bohannon ............. G06F 16/345 |
| 2020/0257850 A1 | 8/2020 | Carbune et al. |

FOREIGN PATENT DOCUMENTS

| | | |
|---|---|---|
| CN | 106126732 | 11/2016 |
| CN | 107026787 | 8/2017 |

OTHER PUBLICATIONS

A. Torralba and A. A. Efros, "Unbiased look at dataset bias," CVPR 2011, Colorado Springs, CO, USA, 2011, pp. 1521-1528, doi: 10.1109/CVPR.2011.5995347. (Year: 2011).*

Taboada M, Brooke J, Tofiloski M, Voll K, Stede M. Lexicon-based methods for sentiment analysis. Computational linguistics. Jun. 1, 2011;37(2):267-307. (Year: 2011).*

Australian Government; Examination Report No. 1 issued in Application No. 2020221062, 3 pages, dated May 31, 2022.

Australian Government; Notice of Acceptance issued in Application No. 2020221062, 3 pages, dated Jun. 23, 2022.

Moreira C, Martins B, Calado P. , Using rank aggregation for expert search in academic digital libraries, arXiv preprint arXiv, Jan. 21, 2015.

Hamman, S. et al.; "MedFact: Towards Improving Veracity of Medical Information in Social Media Using Applied Machine Learning;" International Conference on Financial Cryptography and Data Security; [Lecture Notes in Computer Science], Springer; pp. 108-120; Apr. 6, 2018.

European Patent Office; International Search Report and Written Opinion of PCT Ser. No. PCT/US2020/017559; 11 pages; dated Jun. 2, 2020.

Intellectual Property India; Hearing Notice issued in Application No. 202127035628; 2 pages; dated Jan. 5, 2024.

China National Intellectual Property Administration; Notification of First Office Action issued in Application No. 202080019005.2; 37 pages; dated Jan. 20, 2024.

* cited by examiner

Travel to Thailand!
By Jim Smith

Thailand is a nation in southeast Asia that is home to over 60 million people. With bustling metropolises like Bangkok and Chiang Mai, Thailand is the best country in Asia to visit. Not only is Thailand home to many cultural wonders, but then country is known for its wonderful cuisine. As evidence, famous food travel expert Anthony Example has traveled numerous times to Thailand. He has tried all types of cuisine and loves the food of Thailand. So, if you are thinking of traveling somewhere adventurous, give Thailand a try!

The author is a travel agent that specializes in trips to Thailand.

Anthony Example has written numerous articles and books related to all types of cuisine, including Thai cuisine.

Document A
Document B

FIG. 4A

GENERATING AND PROVISIONING OF ADDITIONAL CONTENT FOR SOURCE PERSPECTIVE(S) OF A DOCUMENT

BACKGROUND

A user may have interest in reading a document, but have little or no knowledge of the source (e.g., author, creator, and/or publisher) of the document. For example, a user may read a news article without knowing the author of the article, the background of the author, and/or the intended audience for the document. In some instances, the document includes information that is not necessarily based on objective reasoning but is, instead, based on experiences and/or subjective opinions that are particular to the source. Some instances of source perspectives included in content of a document may be identifiable by the user without additional information. However, some content may have instances that are not readily recognizable by the reader as including a source perspective. Further, whether content of a document is considered to include a source perspective can be a subjective determination by a user and, as a result, can vary from user to user. For example, one user can deem certain content includes a source perspective, while another user may not deem that certain content includes a source perspective.

In some instances, the source of a document may be the source of additional documents, the source may be the subject of other documents, and/or additional information regarding the experiences of the source may be available. A user can attempt to manually identify these additional documents and/or information. However, substantial computational and network resources can be required for the user to search for and identify relevant additional information related to the source in order to decide whether any of the statements of the source are indicative of a source perspective. For example, the user may have to switch to another application on their computing device, issue one or more searches for additional information about the source using the other application, and review such information. This can consume both resources of the computing device (e.g., switching to the other application and reviewing information) and network resources (e.g., in issuing the searches and retrieving the information). Further, such consumption of resources is exacerbated when multiple users that view the document each perform similar searches and reviews of source information. Yet further, different users can identify different additional information when determining whether statement(s) of a source are indicative of a source perspective. This can be due to the different users performing different searches, selecting different search results, viewing different portions of selected search result document(s), etc. As a result of the different additional information, the different users can reach different conclusions with regards to whether the statement(s) are indeed indicative of a source perspective.

SUMMARY

Implementations described herein determine, for a given document, one or more portions of content (e.g., sentences, phrases, paragraphs, etc.) of the given document that may be influenced by a source perspective of a given source associated with the portion(s) of the content. Further, those implementations determine one or more additional documents that are related to the given source (e.g., also from the given source and/or describing the given source) and that are related to the portion(s) of content of the given document. Yet further, some of those implementations utilize the additional document(s) to determine additional content that provides context for the portions of content of the given document that may be influenced by a source perspective of the given source. A relationship, between the additional content and the portions of the given document, can be defined. Based on the relationship being defined, the additional content can be caused to be rendered at a client device in response to the client device accessing the given document. For example, rendering of the given document can be modified to incorporate the additional content, the additional content can be presented in a pop-up window, or a selectable indication of the additional content can be provided and, if selected, can cause the additional content to be presented. As described herein, determining that a portion of content is a source perspective portion can be an objective determination. Further, determining additional document(s) and/or additional content based on the additional document(s) can likewise be an objective determination. Accordingly, implementations present a uniform (e.g., independent of a user's analysis) process for determining whether portion(s) of a document include a source perspective and/or for determining additional document(s) and/or additional content that are related to a source of content that includes a source perspective.

As one example, a user can access a document that is related to the travel experiences of an author of the document. The document can include the phrase "Thailand is the best country in Asia." Based on one or more terms of the phrase (e.g., "best" being a term that implies an opinion), the phrase can be identified as a phrase that may include a source perspective of the author. Additional documents associated with the author can include other articles written by the author, publicly available biographical information for the author, and/or other documents that detail the experiences of the author. The additional documents and the potential source perspective phrase can be provided as input to a trained machine learning model to generate a relatedness score between the phrase and each of the additional documents. For example, one of the documents can include information related to other countries that the author has visited. Based on a generated relatedness score between the additional document and the identified phrase being indicative of relevance of the content of the additional document and the phrase, additional content can be determined based on the additional document. For instance, the additional content can include a link to the additional document, a summary of the additional document, and/or other information regarding the author that is identified from the additional document. For example, the additional content can include a pop-up box associated with the phrase "Thailand is the best country in Asia", where the pop-up box indicates that Thailand is the only country in Asia that the author has visited, as identified from the related additional document.

A "document", as used herein, is to be broadly interpreted and can include, for example, an article, a news item, a blog entry, a social media posting, a web page, an email, an image, an audio clip, a video clip, a quote, an advertisement, a news group posting, a word processing document, a portable document format document, and/or other documents. Further, implementations described herein can be applied to all or portions of a document. A portion of a document can include, for example, a sentence, a phrase, a title, a footnote, an advertisement, an image, a quote, an audio clip, a video clip, metadata of the document, and/or other portions. As described herein, documents can be stored in one or more corpuses and a relationship between one or more documents, source(s) thereof, and/or other entities can be defined in a knowledge graph.

A "source perspective", as used herein, is to be broadly interpreted and can include, for example, specific perspectives, basis or prior positions, predispositions, experiences, biases, inclinations, preferences, specific assumptions, opinions, and/or other perspectives that alter a representation of content from a purely objective perspective toward a subjective perspective. Further, a source perspective can be explained by explicit content of additional documents (e.g., portion(s) of additional documents) and/or implicit content of additional documents (e.g., inferred based on portion(s) of additional documents).

The above is provided as an overview of some implementations disclosed herein. Further description of these and other implementations is provided below.

In some implementations, a method performed by one or more processors is provided and includes identifying a target electronic document and a source that generated the target electronic document. The method further includes processing the target electronic document to determine a source perspective portion of the target electronic document, and searching one or more corpuses to identify a plurality of additional resources that are related to the source. The method further includes, for each of the identified additional resources that are related to the source: processing corresponding additional resource features of a corresponding one of the additional resources and features of the source perspective portion to generate a corresponding relatedness score. The corresponding relatedness score indicates a degree of relatedness between the source perspective portion and the corresponding one of the additional resources. In various implementations, the relatedness score between the source perspective portion(s) and a corresponding one of the additional electronic documents indicates relatedness in the sense that it provides a basis for understanding of source perspective(s) of the source perspective portion(s) as opposed to only providing more detail on the underlying topic(s) of the source perspective portion(s). Thus, the relatedness score can represent an explanatory extent of each of the additional electronic documents for the source perspective portion(s) of the target electronic document. For example, for a source perspective portion of "Thailand is great", a first additional resource that describes how the source is funded by a tourism commission associated with Thailand can have a higher degree of relatedness than a second additional resource that provides factual information about Thailand. Various techniques can be utilized in determining such relatedness scores, such as machine learning based techniques and/or knowledge graph based techniques disclosed herein. The method further includes, responsive to determining that the relatedness score, of a given additional resource of the additional resources, satisfies a threshold: defining, in one or more databases, a relationship between the target electronic document and additional content generated based on the given additional resource. The method further includes, subsequent to defining the relationship, and responsive to the relationship being defined: causing a computing device that is rendering the target electronic document to render at least a portion of the additional content and/or a link to the additional content, simultaneous with the rendering of the target electronic document at the computing device.

These and other implementations of technology disclosed herein can optionally include one or more of the following features.

In some implementations, defining the relationship between the target electronic document and the additional content generated based on the given additional resource includes defining a relationship between the source perspective portion of the target electronic document and the additional content. In some of those implementations, causing the computing device that is rendering the target electronic document to render the at least a portion of the additional content simultaneous with the rendering of the target electronic document at the computing device includes: causing the computing device to render the at least a portion of the additional content along with rendering an indication that the at least a portion of the additional content is relevant to the source perspective portion. In some versions of those implementations, for the target electronic document, the at least a portion of the additional content is defined as having a relationship to only the source perspective portion. In some of those versions, the indication that the at least a portion of the additional content is relevant to the source perspective portion is an indication that the additional content is relevant to only the source perspective portion.

In some implementations, causing the computing device that is rendering the target electronic document to render the at least a portion of the additional content simultaneous with the rendering of the target electronic document at the computing device includes: causing the computing device to initially render a selectable interface element that indicates additional content relevant to source perspective is available, without initially rendering the at least a portion of the additional content; and causing the computing device to render the at least a portion of the additional content responsive to affirmative user interface input directed to the selectable interface element.

In some implementations, the method further includes generating the additional content based on the given additional resource. In some of those implementations, generating the additional content includes: including a link to the given additional resource in the additional content, including a phrase from the given additional resource in the additional content, and/or including a summary of the given additional resource in the additional content.

In some implementations, the method further includes generating the additional content based on the given additional resource and based on a further additional resource of the additional resources. Generating the additional content based on the further additional resource can be responsive to the corresponding relatedness score of the further additional resource satisfying the threshold.

In some implementations, processing the corresponding additional resource features of the corresponding one of the additional resources and the features of the source perspective portion to generate a corresponding relatedness score includes: applying the corresponding additional resource features and the features of the source perspective portion as input to a trained machine learning model; and generating the corresponding relatedness score based on processing the corresponding additional resource features and the features of the source perspective portion using the trained machine learning model.

In some implementations, the additional resources related to the source include: other documents written by the source; documents that include references to the source; and/or one or more entries, in a knowledge graph, that are mapped to a source entry, of the knowledge graph, that corresponds to the source; and/or documents that include references to one or more terms in the target electronic document.

In some implementations, the method further includes: processing the target electronic document to determine an additional source perspective portion of the target electronic document; and generating an additional relatedness score that indicates a degree of relatedness between the additional source perspective portion and the given additional resource. Generating the additional relatedness score is based on processing of the corresponding additional resource features and additional features of the additional source perspective portion. In some of those implementations, the method further includes determining that the additional relatedness score fails to satisfy the threshold, and defining the relationship between the target electronic document and the additional content generated based on the given additional resource includes: defining the relationship between the source perspective portion of the target electronic document and the additional content, based on the relatedness score satisfying the threshold, and refraining from defining any relationship between the additional source perspective portion of the target electronic document and the additional content, based on the additional relatedness score failing to satisfy the threshold.

In some implementations, causing the computing device that is rendering the target electronic document to render the at least a portion of the additional content simultaneous with the rendering of the target electronic document at the computing device includes: causing the computing device to render the at least a portion of the additional content along with rendering an indication that the additional content is relevant to the source perspective portion.

In some implementations, the source is an author, a creator, and/or a publisher.

In some implementations, a method implemented by one or more processors is provided and includes: identifying a target electronic document and a source that generated the target electronic document; processing the target electronic document to determine a source perspective portion of the target electronic document; searching one or more corpuses to identify a plurality of additional resources that are related to the source; determining a relatedness score between each of the additional resources and the source perspective portion of the target electronic document; and generating a source perspective summary for the source perspective portion of the target electronic document. The source perspective summary is generated based on one or more of the additional resources and the relatedness scores of the corresponding one or more additional resources. The method further includes responsive to a request, from a computing device, for the target electronic document: causing the computing device to render an interface that includes the target electronic document with a selectable portion that, when selected, causes the source perspective summary to be rendered along with the target electronic document.

These and other implementations of technology disclosed herein can optionally include one or more of the following features.

In some implementations, the selectable portion includes the source perspective portion, and further includes causing the source perspective portion to be graphically demarcated from non-source perspective portions of the target electronic document.

In some implementations, the source perspective summary, when rendered, is rendered in a separate interface portion when a user selects the selectable portion of the target electronic document.

In some implementations, the selectable portion consists of the source perspective portion.

In some implementations, the source perspective summary, when rendered, is rendered in a separate section of the interface from the target electronic document, and selecting the source perspective summary, when rendered, causes at least a portion of the one or more additional resources to be rendered.

In some implementations, the source perspective summary is generated based on at least a first additional resource and a second additional resource of the one or more of the additional resources.

In some implementations, a method implemented by one or more processors is provided and includes identifying a target electronic document, processing the target electronic document to determine a source perspective portion of the target electronic document, identifying at least one source of the target electronic document, and searching, based on identifying the at least one source of the target electronic document one or more corpuses to identify a plurality of additional resources that are explanatory of the source perspective portion of the target electronic document. The method further includes, for each of the identified additional resources that are explanatory of the source perspective portion of the target electronic document, processing corresponding additional resource features of a corresponding one of the additional resources and features of the source perspective portion to generate a corresponding relatedness score. For example, the corresponding relatedness score can represent an explanatory extent of the corresponding one of the additional resources for the source perspective portion of the target electronic document. The method further includes selecting, based on the relatedness scores, and from the identified additional resources, at least a first additional resource and a second additional resource that are explanatory of the source perspective portion of the target electronic document. The method further includes generating, based on at least first content of the first additional resource and second content of the second additional resource, a source perspective summary for the at least one source. The method further includes, subsequent to generating the source perspective summary for the at least one source, causing a computing device that is rendering the target electronic document to render the source perspective summary for the at least one source simultaneous with the rendering of the target electronic document at the computing device.

These and other implementations of technology disclosed herein can optionally include one or more of the following features.

In some implementations, the at least one source includes an author that penned the target electronic document, and the source perspective summary includes an author perspective summary.

In some versions of those implementations, generating the bias summary for the at least one source based at least the first content of the first additional resource and the second content of the second additional resource includes analyzing at least the first content of the first additional resource and the second content of the second additional resource to determine an explanation of the source perspective portion of the target electronic document for the author, and including, in the author perspective summary, the explanation of the source perspective portion of the target electronic document for the author.

In some further versions of those implementations, the explanation of the source perspective portion of the target electronic document for the author includes a natural language explanation of the source perspective portion of the target electronic document or source perspective metrics for the source perspective portion of the target electronic document. In yet further versions of those implementations, generating the source perspective summary for the at least one source based on at least the first content of the first additional resource and the second content of the second additional resource includes generating a first portion of the author perspective summary based on the natural language explanation of the source perspective portions of the target electronic document, generating a second portion of the author perspective summary based on the source perspective metrics for the source perspective portions of the target electronic document, and including, in the author perspective summary, both the first portion of the author perspective summary and the second portion of the author perspective summary.

In some further versions of those implementations, at least the first additional resource and the second additional resource that are explanatory of the source perspective portion of the target electronic document include other documents penned by the author, social media posts of a social media account associated with the author, or social media interactions of the social media account associated with the author. In yet further versions of those implementations, generating the bias summary for the at least one source based on at least the first content of at least the first additional resource and the second content of the second additional resource includes generating a first portion of the author perspective summary based on additional content of the other documents penned by the author, and generating a second portion of the author perspective summary based on the social media posts and the social media interactions of the social media account associated with the author.

In some versions of those implementations, generating the source perspective summary for the at least one source based on at least the first content of the first additional resource and the second content of the second additional resource includes including, in the author perspective summary, a listing of links to at least the first additional resource and the second additional resource that are explanatory of the source perspective portion of the target electronic document.

In some versions of those implementations, the at least one source further includes a creator that collated the target electronic document, and the source perspective summary further includes a separate creator perspective summary. In some further versions of those implementations, the method further includes searching, based on identifying the at least one source further includes the creator of the target electronic document, one or more of the corpuses to identify a plurality of further additional resources that are explanatory of the source perspective portion of the target electronic document. In some further versions of those implementations, the method further includes, for each of the identified further additional resources that are explanatory of the biased portion of the target electronic document, processing corresponding further additional resource features of a corresponding one of the further additional resources and the features of the biased portion to generate a corresponding additional relatedness score. For example, the corresponding relatedness score can represent an explanatory extent of the corresponding one of the additional resources for the source perspective portion of the target electronic document. In some further versions of those implementations, the method further includes selecting, based on the additional relatedness scores, and from the identified further additional resources, at least a third additional resource and a fourth additional resource that are explanatory of the biased portion of the target electronic document. In some further versions of those implementations, the method further includes generating, based on at least the third content of the third additional resource and fourth content of the fourth additional resource, the creator perspective summary for the at least one source.

In yet further versions of those implementations, generating the source perspective summary for the at least one source based on at least the third content of the third additional resource and the fourth content of the fourth additional resource includes analyzing at least the third content of the third additional resource and the fourth content of the fourth additional resource to determine an explanation of the source perspective portion of the target electronic document for the creator, and including, in the creator perspective summary, the explanation of the source perspective portion of the target electronic document for the creator. In even further versions of those implementations, the explanation of the source perspective portion of the target electronic document for the creator includes a natural language explanation of the source perspective portion of the target electronic document or source perspective metrics for the source perspective portion of the target electronic document. In yet even further versions of those implementations, generating the source perspective summary for the at least one source based on at least the third content of the third additional resource and the fourth content of the fourth additional resource includes generating a first portion of the creator perspective summary based on the natural language explanation of the source perspective portion of the target electronic document, generating a second portion of the creator perspective based on the source perspective metrics for the source perspective portion of the target electronic document, and including, in the creator perspective summary, both the first portion of the creator perspective summary and the second portion of the creator perspective summary.

In some implementations, searching one or more of the corpuses to identify the plurality of additional resources that are explanatory of the source perspective portion of the target electronic document includes applying one or more de-duping techniques to the identified plurality of additional resource to determine a subset of the identified plurality of additional resources, generating, based on features of the subset of the identified plurality of additional resource, source perspective metrics for the source perspective portions of the target electronic document, and including, in the source perspective summary, the source perspective metrics for the source perspective portions of the target electronic document.

In some implementations, one or more of the corpuses include a knowledge graph having source nodes corresponding to the at least one source connected to at least resource nodes corresponding to the plurality of additional resources. In some versions of those implementations, processing the corresponding additional resource features of the corresponding one of the additional resources and the features of the source perspective portion to generate the corresponding relatedness score for each of the identified additional resources that are explanatory of the source perspective portion of the target electronic document includes applying the knowledge graph as input across a graph neural network to generate embedding nodes corresponding to the source nodes and resource nodes of the knowledge graph, and generating, based on information included in the embedding nodes, the relatedness scores.

In some implementations, a method implemented by one or more processors is provided and includes: identifying a target electronic document, processing the target electronic document to determine a source perspective portion of the target electronic document, identifying a publisher that published the target electronic document, and searching, based on identifying the publisher that published the target electronic document, one or more corpuses to identify a plurality of additional resources that are explanatory of the source perspective portion of the target electronic document and that are also published by the publisher. The method further includes, for each of the identified additional resources that are explanatory of the source perspective portion of the target electronic document, processing corresponding additional resource features of a corresponding one of the additional resources and features of the source perspective portion to generate a corresponding relatedness score. For example, the corresponding relatedness score can represent an explanatory extent of the corresponding one of the additional resources for the source perspective portion of the target electronic document. The method further includes selecting, based on the relatedness scores, and from the identified additional resources, at least a first additional resource and a second additional resource that are explanatory of the source perspective portion of the target electronic document, and generating, based on at least first content of the first additional resource and second content of the second additional resource, a publisher perspective summary. The method further includes, subsequent to generating the publisher perspective summary, causing a computing device that is rendering the target electronic document to render the publisher perspective summary simultaneous with the rendering of the target electronic document at the computing device.

These and other implementations of technology disclosed herein can optionally include one or more of the following features.

In some implementations, generating the publisher perspective summary based on at least the first content of the first additional resource and the second content of the second additional resource includes analyzing at least the first content of the first additional resource and the second content of the second additional resource to determine an explanation of the source perspective portion of the target electronic document for the publisher, and including, in the publisher perspective summary, the explanation of the source perspective portion of the target electronic document for the author.

In some versions of those implementations, the explanation of the source perspective portion of the target electronic document for the publisher includes a natural language explanation of the source perspective portion of the target electronic document or source perspective metrics for the source perspective portions of the target electronic document.

In some further versions of those implementations, generating the publisher perspective summary based on at least the first content of the first additional resource and the second content of the second additional resource includes generating a first portion of the publisher perspective summary based on the natural language explanation of the source perspective portion of the target electronic document, generating a second portion of the publisher perspective based on the source perspective metrics for the source perspective portions of the target electronic document, and including, in the publisher perspective summary, both the first portion of the publisher perspective summary and the second portion of the publisher perspective summary.

In some implementations, a system is provided and includes a database, memory storing instructions, and one or more processors executing the instructions, stored in the memory, to cause the one or more processors to: identify a target electronic document, process the target electronic document to determine one or more source perspective portions of the target electronic document, identify at least one source of the target electronic document, and search, based on identifying the at least one source of the target electronic document, one or more corpuses to identify a plurality of additional resources that are explanatory of one or more of the source perspective portions of the target electronic document. The instructions further cause the one or more processors to, for each of the identified additional resources that are explanatory of one or more of the source perspective portions of the target electronic document, process corresponding additional resource features of a corresponding one of the additional resources and features of one or more of the source perspective portions to generate a corresponding relatedness score. For example, the corresponding relatedness score can represent an explanatory extent of the corresponding one of the additional resources for the source perspective portion of the target electronic document. The instructions further cause the one or more processors to select, based on the relatedness scores, and from the identified additional resources, at least a first additional resource and a second additional resource that are explanatory of one or more of the source perspective portions of the target electronic document, and generate, based on at least first content of the first additional resource and second content of the second additional resource, a source perspective summary for the at least one source. The instructions further cause the one or more processors to, subsequent to generating the source perspective summary for the at least one source, and responsive to receiving an indication to view the source perspective summary from a user consuming the target electronic document, cause a computing device that is rendering the target electronic document to render the source perspective summary for the at least one source along with the rendering of the target electronic document at the computing device.

In some implementations, a method implemented by one or more processors is provided and includes identifying a target electronic document, processing the target electronic document to determine a source perspective portion of the target electronic document, identifying a publisher that published the target electronic document, and searching, based on identifying the publisher that published the target electronic document, one or more corpuses to identify a plurality of additional resources that are also published by the publisher. The method further includes, for each of the identified additional resources that are also published by the publisher, processing corresponding additional resource features of a corresponding one of the additional resources and features of the source perspective portion to generate a corresponding relatedness score. For example, the corresponding relatedness score can represent an explanatory extent of the corresponding one of the additional resources for the source perspective portion of the target electronic document. The method further includes, selecting, based on the relatedness scores, at least a first additional resource that is published by the publisher and a second additional resource that is published by the publisher. The method further includes, responsive to selecting at least the first additional resource and the second additional resource, generating a publisher perspective summary based on first content from the first additional resource and based on second content from the second additional resource, and defining, in one or more databases, a relationship between the target electronic document and the publisher perspective summary generated based on at least the first content from the first additional resource and based on the second content from the second additional resource. The method further includes, subsequent to defining the relationship, and responsive to the relationship being defined, causing a computing device that is rendering the target electronic document to render the publisher perspective summary simultaneous with the rendering of the target electronic document at the computing device.

These and other implementations of technology disclosed herein can optionally include one or more of the following features.

In some implementations, generating the publisher perspective summary based on at least the first content from the first additional resource and the second content from the second additional resource includes including, in the publisher perspective summary, both the first content and the second content. In some versions of those implementations, the first content is first text and the second content is second text. In some further versions of those implementations, the publisher perspective summary includes a single sentence that incorporates the first text and the second text. In some versions of those implementations, causing the computing device that is rendering the target electronic document to render the publisher perspective summary simultaneous with the rendering of the target electronic document at the computing device includes causing the computing device to render the publisher perspective summary along with rendering an indication that the publisher perspective summary is relevant to the source perspective portion.

In some implementations, causing the computing device that is rendering the target electronic document to render the publisher perspective summary simultaneous with the rendering of the target electronic document at the computing device includes causing the computing device to initially render a selectable interface element that indicates additional content relevant to a source perspective is available, without initially rendering the publisher perspective summary, and causing the computing device to render the publisher perspective summary responsive to affirmative user interface input directed to the selectable interface element.

In some implementations, a method implemented by one or more processors is provided and includes identifying a target electronic document, processing the target electronic document to determine a source perspective portion of the target electronic document, identifying an author that authored the target electronic document, searching, based on identifying the author that authored the target electronic document, one or more corpuses to identify a plurality of additional resources that are also authored by the author. The method further includes, for each of the identified additional resources that are also authored by the author, processing corresponding additional resource features of a corresponding one of the additional resources and features of the source perspective portion to generate a corresponding relatedness score. For example, the corresponding relatedness score can represent an explanatory extent of the corresponding one of the additional resources for the source perspective portion of the target electronic document. The method further includes selecting, based on the relatedness scores, at least a first additional resource that is authored by the author and a second additional resource that is authored by the author. The method further includes, responsive to selecting at least the first additional resource and the second additional resource, generating an author perspective summary based on at least first content from the first additional resource and second content from the second additional resource, and defining, in one or more databases, a relationship between the target electronic document and the author perspective summary generated based on the first content from the first additional resource and based on the second content from the second additional resource. The method further includes, subsequent to defining the relationship, and responsive to the relationship being defined, causing a computing device that is rendering the target electronic document to render the author perspective summary simultaneous with the rendering of the target electronic document at the computing device.

These and other implementations of technology disclosed herein can optionally include one or more of the following features.

In some implementations, generating the author perspective summary based on at least the first content from the first additional resource and the second content from the second additional resource includes including, in the author perspective summary, both the first content and the second content. In some versions of those implementations, the first content is first text and the second content is second text. In some further versions of those implementations, the author perspective summary includes a single sentence that incorporates the first text and the second text.

In yet further versions of those implementations, generating the author perspective summary further includes including, in the author perspective summary, a first link to the first additional resource and a second link to the second additional resource. The first link and the second link are included in the author perspective summary based on the first additional resource and the second additional resource being utilized in generating the author perspective summary.

In yet further versions of those implementations, causing the computing device that is rendering the target electronic document to render the author perspective summary simultaneous with the rendering of the target electronic document at the computing device includes causing the computing device to render the author perspective summary along with rendering an indication that the author perspective summary is relevant to the source perspective portion.

In yet further versions of those implementations, causing the computing device that is rendering the target electronic document to render the author perspective summary simultaneous with the rendering of the target electronic document at the computing device includes causing the computing device to initially render a selectable interface element that indicates additional content relevant to an author perspective is available, without initially rendering the author perspective summary, and causing the computing device to render the author perspective summary responsive to affirmative user interface input directed to the selectable interface element.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4A illustrates an example of the additional content rendered along with the target electronic document.

DETAILED DESCRIPTION

Figure 1:
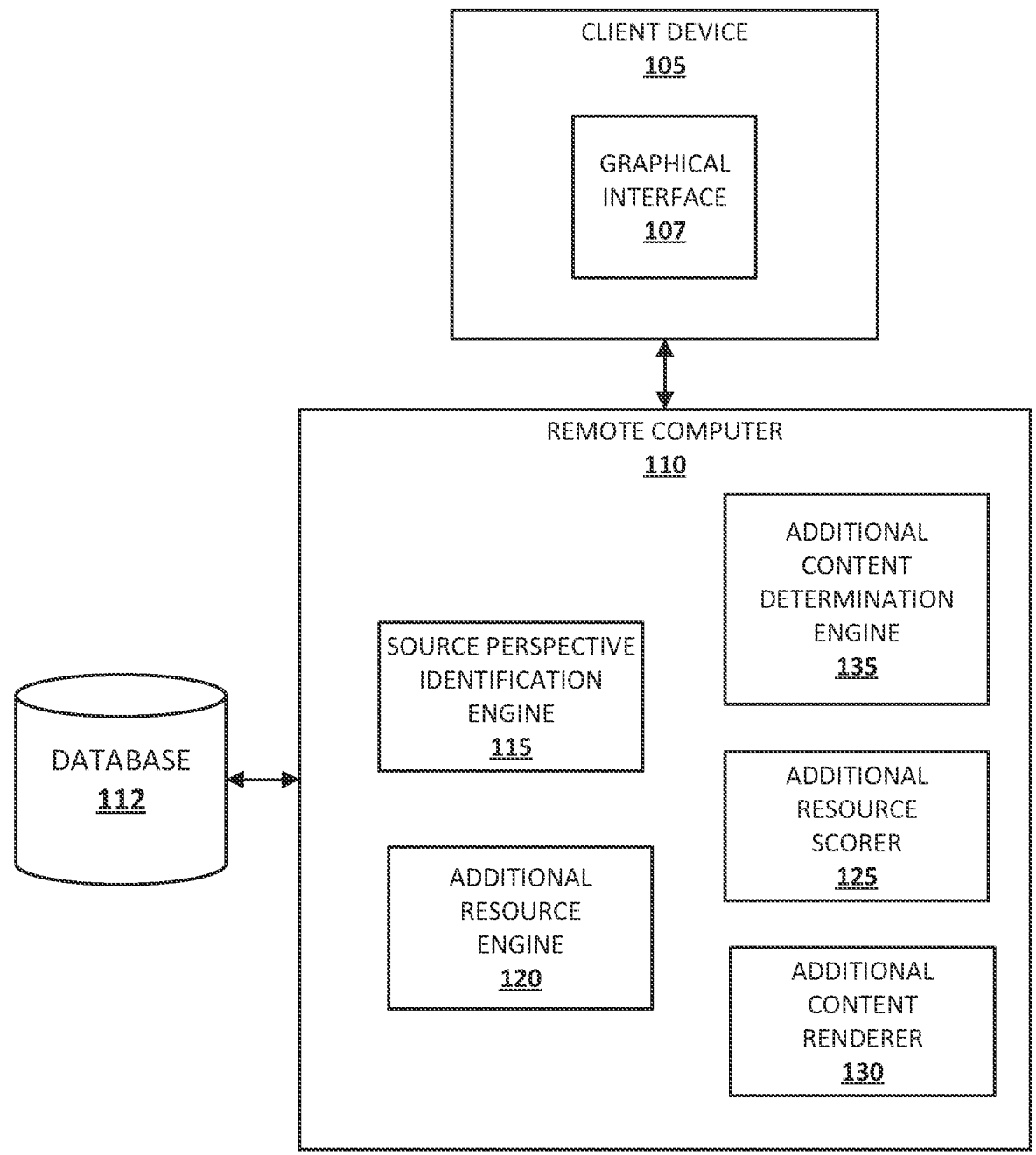
FIG. 1 is a block diagram of an example environment in which implementations disclosed herein can be implemented.

Now turning to FIG. 1, an example environment in which techniques disclosed herein can be implemented is illustrated. The example environment includes a client device 105 and a remote computer 110. Although both the client device 105 and the remote computer 110 are each illustrated in FIG. 1 as single components, it is understood that one or more modules and/or aspects of either can be implemented, in whole or in part, by one or more other devices. For example, in some implementations a first set of modules and/or aspects are implemented by one or more processors of a first remote system, and a second set of modules and/or aspects are implemented by one or more processors of one or more separate remote server device(s) that are in network communication with the remote computer 110. The remote server system(s) can be, for example, a cluster of high performance remote server device(s) that handle requests from one or more client devices, as well as requests from additional devices.

Client device 105 can be a mobile phone computing device, a tablet computing device, and/or a wearable apparatus of the user that includes a computing device (e.g., a watch of the user having a computing device, glasses of the user having a computing device, a virtual or augmented reality computing device). Additional and/or alternative client devices can be provided. Further, one or more components of client device 105 can be implemented on separate devices. For example, application(s) 107 can be implemented on one or more alternate computing devices that are in communication with client device 105. Components of client device 105 and components of remote computer 110 can communicate via a communication network. The communication network can include, for example, a wide area network (WAN) (e.g., the Internet). Further, components of client device 105 can communicate with one or more other components via a communication network. For example, communication network can include a local area network (LAN) and/or BLUETOOTH and can communicate with one or more other devices via the LAN and/or BLUETOOTH (e.g., an automated assistant device communicating with a handheld computing device of a user).

Client device 105 includes one or more applications 107 that can each be utilized to render content to a user of the client device. For example, a user can utilize one of the application(s) 107 (e.g., a web browser application or an automated assistant application) to provide a search query to search engine, and the search engine can provide result(s) responsive to the search query. The user can view results provided by the search engine, and click on (or otherwise select) one of the results to cause the application 107 to render a corresponding document and/or other content corresponding to the search query. The user can interact with the application 107 via one or more input devices of the client device 105, such as a keyboard, a mouse and/or other input device that can select an area of the interface 107, voice controls, touchscreen controls, and/or other input methods that allow the user to submit input and select content to be rendered.

In some implementations, one or more modules of client device 105 and/or remote computer 110 can render a document via one of the application(s) 107. For example, the user can interact with a search engine by providing a search query and the search engine can provide the user with one or more documents (or selectable indications of documents) that can be rendered to the user. The user can then view the rendered content via the application 107 and can, in some instances, interact with the rendered content to be provided with additional content (e.g., selecting links in documents, selecting graphical user interface buttons). As another example, the user can navigate, within one of the application(s) 107, to the document directly.

As an example, a user can be provided, via one of the application(s) 107, with a search result that is responsive to a submitted query of "Articles about travel to Asia". The user can select one of the search results and one of the application(s) 107 can render the document that is associated with the selected link. As used herein, the document of interest to the user will be referred to as the "target electronic document." This can be a document that is rendered based on a search query, as previously described and/or a document that is otherwise rendered via one or more application(s) executing on the client device 105.

In many instances, a target electronic document is associated with at least one source. The at least one source can include an author of the document, the publisher of the document, and/or a creator of the document. The publisher of a document can be, for example, a website that hosts the document and/or a corporation that prepares and/or publishes the document. For example, a news agency that prepares and/or publishes a news article can be the publisher of the news article document. The creator of a document can be one or more individuals that collated content of the document, but that didn't necessarily originally author the content of the document. The author of a document can be the individual that penned the textual content of the document and/or generated other portions (e.g., images) of the target electronic document. For example, a target electronic document that is a news story can specify the source in the text of the document, can specify the source in metadata associated with the document, and/or the source can be identified based on content of another related document. Because the author is human, the creator includes one or more humans, and humans act on behalf of the publisher, and those human(s) have unique experiences and opinions, one or more portions of the target electronic document may include a source perspective based on those opinions and/or experiences. In some instances, the reader may not be aware of these experiences and/or opinions and may accept the content of the document as objective even if one or more portions may in fact be skewed by the opinion of the source.

To determine whether portion(s) of a target electronic document include a source perspective, a user may have to view multiple resources to determine the source perspective, if one even exists. Further, the user may navigate through multiple documents to determine the source perspective and may not find an additional resource that is related to a source perspective (and further, may not know when to stop searching for content that explains a source perspective). Thus, additional computing resources and time may be expended, sometimes uselessly (i.e., if no source perspective can be determined from additional resources) for a user to determine whether a source perspective exists. Thus, by providing the user with indications in a target electronic document of portions that may include a source perspective and further providing the user with additional resources to allow the user to determine whether a particular portion actually includes a source perspective, it is unnecessary for the user to perform additional searching. Further, the user can be provided with a summary of additional resources within the target electronic document, which reduces the need for the user to navigate away from a target electronic document to assess additional resource(s) that can indicate a potential source perspective. Moreover, implementations present an objective and uniform process for determining whether portion(s) of a document include a source perspective and/or for determining additional document(s) and/or additional content that are related to portion that includes a source perspective. Accordingly, whether portions of a document are considered to include a source perspective and/or additional content that is presented for source perspective portion(s) can be determined independent of subjective considerations of a user to which the additional content is presented.

Source perspective identification engine 115 determines whether one or more portions of a target electronic document include source perspective content and, if so, flags such portion(s) as including a source perspective. Source perspective portions of a target electronic document are portions of the document that indicate that the source may have included such portions based on specific perspectives, basis or prior positions, predispositions, experiences, biases, inclinations, preferences, specific assumptions, opinions, and/or other perspectives that alter a representation of content from a purely objective perspective toward a subjective perspective, and not on objective facts. As described herein, source perspective identification engine 115 can utilize various techniques to determine that a portion of a target electronic document includes a source perspective. It is noted that, in various implementations, a determination that a portion of a target document includes a source perspective does not necessarily conclusively mean that the portion is a source perspective. Rather, it means that source perspective identification engine 115 has determined, utilizing one or more objective techniques such as those disclosed herein, that a feature of the portion and/or a measure determined based on the portion, indicates that the portion has at least a threshold probability of including a source perspective.

Figure 2:
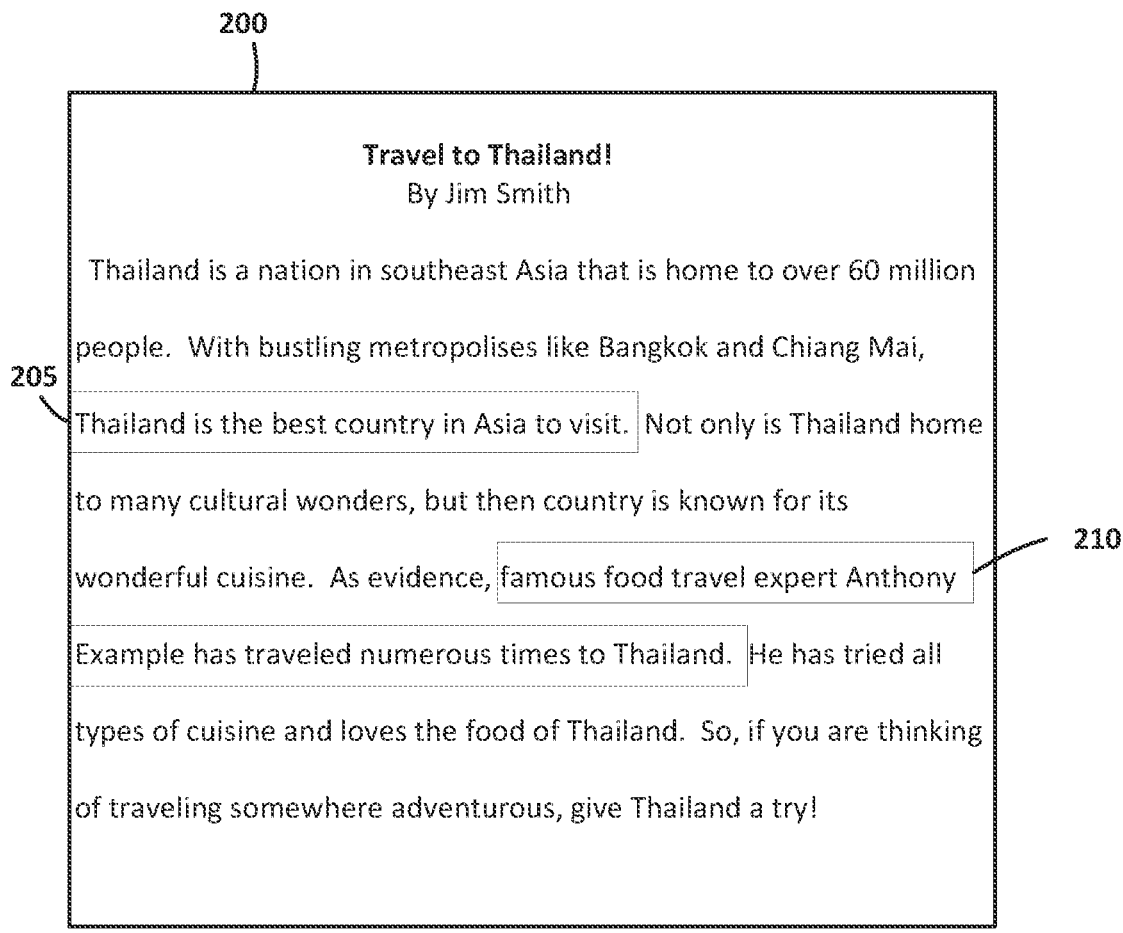
FIG. 2 illustrates a target electronic document with biased portions highlighted.

Referring to FIG. 2, an example of a target electronic document is provided. The target electronic document 200 includes portions 205 and 210 that may include a source perspective. Source perspective identification engine 115 can determine that portions 205 and 210 include a source perspective based on one or more terms included in the portions, based on similarity between the portions and one or more other documents that have been annotated to indicate that a portion includes a source perspective, and/or based on other methods that determine that a portion includes a source perspective.

Portion 205 includes one or more terms that source perspective identification engine 115 can identify as terms that likely indicate a source perspective. For example, the portion 205 states that "Thailand is the best country in Asia to visit." In some implementations, source perspective identification engine 115 can identify one or more terms, such as "best," as terms that are often indicative of a source perspective and not based wholly on objective facts. Thus, in some of those implementations, source perspective identification engine 115 can determine that portion 205 includes a source perspective, based at least in part on presence of the term "best". Other terms that can be indicative of source perspective are "I" and/or "I think," other superlatives ("greatest," "worst," etc.), and/or other terms that indicate that the corresponding portion of the document is influenced by the author's opinions, assumptions, biases, and/or other subjective criteria.

In some implementations, source perspective identification engine 115 can additionally or alternatively determine that a portion of the target electronic document is a source perspective portion based on comparison between the portion and one or more annotated documents (e.g., human annotated documents). For example, one or more humans can be provided with a number of documents and the user can annotate each document with an indication of whether the document includes a source perspective, a score indicative of the level of source perspective in a document, and/or other annotations that can be utilized by source perspective identification engine 115 to determine whether a portion is similar to other documents that include source perspective portion(s). For example, source perspective identification engine 115 can compare portion 210, which states that "Famous food travel expert Anthony Example has traveled numerous times to Thailand," with other annotated documents and, based on the similarities between the portion 210 and documents that are annotated as including source perspective portion(s), determine that portion 210 is a source perspective portion. Portion 210 can be determined to be a source perspective portion based on a declaration by the author that Anthony Example is "a famous food travel expert."

In some implementations, source perspective identification engine 115 additionally or alternatively utilizes a trained machine learning model in determining whether a portion of a document includes a source perspective. For example, the trained machine learning model can be trained based on training instances that each include training instance input of a portion of text (and/or a representation of the portion of text), and training instance output that indicates whether the portion of text is a source perspective portion. As one particular example, the trained machine learning model can be a feed forward neural network and the training instance inputs can each be an embedding (e.g., a Word2Vec embedding) of a corresponding portion of text, and the training instance outputs can each be a human labeled indication of whether the corresponding portion of text is a source perspective portion. For instance, the training instance outputs can be "1" if a corresponding portion of text is deemed "highly likely to include" a source perspective and an explanation thereof, "0.75" if the corresponding portion of text is deemed "highly likely to include" a source perspective but no explanation thereof, "0.5" if the corresponding portion of text is deemed "possibly includes" a source perspective or an explanation thereof, "0.25" if the corresponding portion of text is deemed "likely does not include" a source perspective or an explanation thereof, and "0" if the corresponding portion of text is deemed "highly likely does not include" a source perspective or an explanation thereof. As another example, the trained machine learning model can be a recurrent neural network that accepts portions of text on a term-by-term or token-by-token basis, the training instance inputs can each be a corresponding portion of text, and the training instance outputs can each be a human labeled indication of whether the corresponding portion of text is a source perspective portion. In use, source perspective identification engine 115 can process a portion of text, using the trained machine learning model, to generate a measure that indicates whether the portion is a source perspective portion, and determine whether the portion is actually a source perspective portion based on the measure. For example, if the measure satisfies a threshold (e.g., greater than 0.5), the source perspective identification engine 115 can determine the corresponding portion of text includes a source perspective. The machine learning model can also be updated based on training instances generated by a user (e.g., described with respect to FIGS. 7A and 7B).

Additional resource engine 120 searches to identify additional resources that are related to at least one source of the target electronic document. In some implementations, to conserver network and/or computation resources, additional resource engine 120 searches to identify additional resources for the target electronic document only if source perspective portion(s) of the target electronic document have been identified by source perspective identification engine 115. In some implementations, additional resource engine 120 can identify documents that are associated with the source(s), such as documents that were written by an author of the target document, documents that mention and/or quote the author, documents that are published by a publisher of the target document, documents that mention the publisher, documents that are created by a creator of the target document, and/or other documents that can indicate a source perspective of source(s) of the target document. In some implementations, additional resource engine 120 can utilize a search query that includes one or more terms from source perspective portion(s) of the target electronic document (or based on the source perspective portion(s)) to identify additional resources that may be pertinent to the source perspective portion(s). Such a search query can also include a name of source(s) of the target electronic document, or be restricted to a search of document(s) by and/or related to one or more of the source(s), to identify additional resources that are generated (e.g., authored, published, and/or created) by the source and that may be pertinent to one or more of the source perspective portions of the document. For example, referring to FIG. 2, additional resource engine 120 can submit a search query of "author Jim Smith" to be provided with documents related to the author. Also, for example, additional resource engine 120 can additionally or alternatively submit a search query of "Thailand", with a restriction of "author: Jim Smith" to a search engine to be provided with documents related to the author that are also related to the subject matter of the document. Also, for example, additional resource engine 120 can additionally or alternatively submit a search query of "Thailand" with a restriction of "author: Jim Smith" to identify document(s) related to portion 205, and submit a search query of "Anthony Example Thailand" to identify document(s) related to portion 210. As yet another example, if target electronic document 200 is published by Hypothetical News Corporation, additional resource engine 120 can additionally or alternatively submit a search query with a restriction of "publisher: Hypothetical News Corporation", and optionally with a restriction of "author: Jim Smith". If both restrictions are included, identified additional resources will be restricted to those that are by "Jim Smith" and published by "Hypothetical News Corporation".

As mentioned above, in some implementations, the additional resources can include other documents written by the same author as the target electronic document, published by the same publisher as the target electronic document, and/or created by the same creator as the target electronic document. For example, a search query seeking additional resources for a target electronic document penned by "Jim Smith" can include "Jim Smith", or a restrict identifier of "Jim Smith", or the search corpus can be restricted to document(s) penned by "Jim Smith". For example, additional resource engine 120 can search one or more databases, such as a database that includes author names and authored documents, to identify the documents that were penned by the author.

In some implementations, the additional resources can include one or more documents that include a reference to the source of the target electronic document. For example, one or more documents can include a biography of an author and/or otherwise reference the author (but are not necessarily penned by the author). To identify additional resource(s) about a source, a search query seeking the additional resources can include the source's name, or the search corpus can be restricted to document(s) that have a defined relationship to the source (e.g., in a database that maps documents to corresponding entities referenced in the documents). Referring again to FIG. 2, portion 205 states that "Thailand is the best country in Asia to visit." Additional resource engine 120 can identify a website and/or other document as an additional resource based on the document including a biography of the author that indicates "Jim Smith is a travel agent that specializes in trips to Thailand," which can be utilized by a reader to assess whether a statement in the target electronic document is a source perspective.

In some implementations, additional resource engine 120 can identify one or more documents that include references to one or more terms included in the target electronic document. For example, portion 210 includes a reference to "Anthony Example" and the author may be basing a statement on the opinion of another person and/or may be making a statement about a person and/or other subject that reflects their own perspective. For example, the statement "Thailand is a huge country" may be an opinion of the author. Thus, additional information related to Thailand's population and/or area may assist a reader is determining whether the country is in fact "huge." To identify the source perspective of another author and/or person, additional resource engine 120 can search to identify additional resources that can indicate a source perspective of the author regarding another subject.

In some implementations, additional resource engine 120 can identify one or more additional resources based on entries in a knowledge graph. For example, additional resource engine 120 can identify an entry for the source in a knowledge graph. Further, the entry for the source can be further mapped, in the knowledge graph (directly and/or indirectly), to one or more additional entries that are related to document(s) that have been generated by the source of the target electronic document. The additional resource engine 120 can identify the document(s) for the one or more additional entries based on those entries being mapped, in the knowledge graph, to the entry for the source. As another example, the entry for the source can be further mapped, in the knowledge graph, to one or more additional entries that each define a corresponding curated resource for the source, and one or more of the corresponding curated resources can be utilized as an additional resource. For instance, a curated resource for an author can include information indicating topic(s) for which the author is considered an expert, topic(s) about which the author has written, and/or other information. Also, for instance, a curated resource for a publisher can include information indicating topic(s) for which the publisher is considered an expert, topic(s) about which the publisher has published, verified biases of the publisher, and/or other information. Such a curated resource for a source can be utilized as an additional resource.

For each of the identified additional resources, additional resource scorer 125 can optionally determine one or more relatedness scores that are each indicative of relatedness between the additional resource (or a portion of the additional resource) and the electronic document. For example, the additional resource scorer 125 can determine, for a given additional resource, a first relatedness score between the given resource and a first source perspective portion of the target electronic document, a second relatedness score between the given resource and a second source perspective portion of the target electronic document, etc. For instance, the additional resource scorer 125 can determine the first relatedness score based on comparison of the first source perspective portion to one or more aspects of the given resource, can determine the second relatedness based on comparison of the second source perspective portion to one or more aspects of the given resource (the same and/or alternative aspect(s)), etc. Further, as described herein, based on the multiple relatedness scores for the given resource, the given resource can be determined to be relevant to (and stored in association with) only some of multiple source perspective portions (e.g., only one source perspective portion).

Additional resource scorer 125 can determine a relatedness score based on comparison of features of a given additional resource to identified source perspective portion(s) of the target electronic document. For example, additional resource engine 120 can identify an additional resource that mentions "Anthony Example" and additional resource scorer 125 can determine a relatedness score for the additional portion 210 and the additional resource that is more indicative of relatedness than is a relatedness score for the portion 205 and the additional resource. This can be based on term(s) in the additional resource matching (soft and/or exact) term(s) in the additional portion 210, but failing to match term(s) in the portion 205 (e.g., the portion 205 does not mention "Anthony Example", and the additional resource may not include any content related to "Thailand"). Also, for example, additional resource engine 120 can identify a document that includes the term "Thailand" and additional resource scorer 125 can determine a relatedness score for the additional resource and portion 205 that is more indicative of relatedness than is a relatedness score for the additional resource and additional portion 210 (e.g., the additional resource may include the terms "Thailand" and "Asia", that are included in portion 205, but lack the term "Anthony Example").

In some implementations, in determining a relatedness score between portion(s) of a target electronic document and an additional resource, additional resource scorer 125 can process features of the additional resource and features of the source perspective portion(s) using a trained machine learning model, and generate the relatedness score based on such processing. For example, features of a given portion and features of the additional resource can be processed to generate a relatedness score between the given portion and the additional resource. In some implementations, the machine learning model can be trained based on training instances that each include training instance input of: a source perspective portion of text (and/or a representation of the source perspective portion of text), and content from a corresponding additional resource (and/or a representation of the content); and training instance output that indicates whether the content from the corresponding additional resource provides additional context for the source perspective portion of text. As one particular example, the trained machine learning model can be a feed forward neural network and the training instance inputs can each be: an embedding (e.g., a Word2Vec embedding) of a corresponding source perspective portion of text, and an embedding of corresponding content from a corresponding additional resource (e.g., a Word2Vec or other embedding of a snippet of text identified based on including one or more term(s) in common with the source perspective portion). The training instance outputs can be a human labeled indication of whether the corresponding content from the corresponding additional resource provides additional context for the source perspective portion of text. For instance, the training instance outputs can be "1" if a corresponding portion of text is deemed "fully explanatory of the source perspective", "0.5" if the corresponding portion of text is deemed "somewhat explanatory of the source perspective", and "0" if the corresponding portion of text is deemed "unrelated to the source perspective". Thus, the training instance outputs can not only be weighted based on whether the additional resources are related to the corresponding source perspective portion of text, but also weighted based on an extent that the additional resource explains a source perspective portion of a target electronic document. Additional and/or alternative machine learning models can be utilized, such as those having architectures utilized in determining whether two pieces of content are similar, but using "whether one piece of content explains source perspective in the other piece of content" as a supervisory signal instead of similarity. In use, additional resource scorer 125 can process source perspective portion(s) (or features thereof) and content from an additional resource (or features thereof), using the trained machine learning model, to generate relatedness score that indicates whether the content from the additional portion is explanatory of a source perspective in the source perspective portion, and determine whether the portion includes an actual source perspective based on the measure.

In various implementations, the relatedness score between the source perspective portion(s) and a corresponding one of the additional resources (e.g., documents) indicates relatedness in the sense that it provides a basis for understanding of source perspective(s) of the source perspective portion(s) as opposed to only providing more detail on the underlying topic(s) of the source perspective portion(s). Thus, the relatedness score can represent an explanatory extent of each of the additional electronic documents (or a portion thereof) for the source perspective portion(s) of the target electronic document. For example, for a source perspective portion of "Thailand is great", a first additional resource that describes how the source is funded by a tourism commission associated with Thailand can have a higher degree of relatedness than a second additional resource that provides factual information about Thailand. Various techniques can be utilized in determining such relatedness scores, such as machine learning based techniques and/or knowledge graph based techniques disclosed herein.

As described herein, both the source perspective identification engine 115 and the additional resource scorer 125 utilize machine learning models. In various implementations, the source perspective identification engine 115 utilizes a first trained machine learning model, and the additional resource scorer 125 utilizes a distinct, second trained machine learning model. The source perspective identification engine 115 can process a portion(s) of text of electronic document(s), using a trained machine learning model, to generate a measure that indicates whether the portion(s) of the document(s) is a source perspective portion, and to determine whether the portion(s) is actually a source perspective portion based on the measure. For example, features of a potential source perspective portion of "University of Blue basketball is the best" from a news article authored by John Smith can be applied as input to the trained machine learning model, and the measure generated based on output of the machine learning model can indicate whether the potential source perspective portion of "the University of Blue basketball team is the best" is in fact a source perspective of the author John Smith.

In some implementations, the additional resource scorer 125 can process a source perspective portion of a target electronic document and candidate segment(s) of an additional documents, using a trained machine learning model, to generate a relatedness score for the additional document (or at least for the candidate segment(s) of the additional document). In some versions of those implementations, the relatedness score indicates relatedness, between the source perspective portion of the target electronic document and the additional document, in the sense that it indicates a degree to which the candidate segment(s) of the additional document provide for understanding of source perspective(s) of the source perspective portion(s). Put another way, in those versions it is not relatedness in the sense of including only matching or similar content but, rather, relatedness in the sense of explanatory relatedness. The additional resource scorer 125 can, for each of a plurality of additional documents identified by the additional resource engine 120, process text corresponding to a source perspective portion identified by source perspective identification engine 115, along with portion(s) of the additional document, to generate a corresponding relatedness score the additional document. Accordingly, N separate relatedness scores can be generated, with each being generated for a corresponding one of N separate additional documents, based on processing feature(s) of the source perspective portion and feature(s) of the corresponding one of the N separate additional documents. Notably, an additional document that provides an explanation of source perspective(s) can include content that is unrelated to content of source perspective portion(s) of a target electronic document, and that content can be included (e.g., all of) in the content that is processed in determining a relatedness score for the additional document.

Further, additional resource engine 120 can search to identify additional resources related to a target electronic document. In some implementations, the additional resource engine 120 can search one or more corpuses of electronic resources (e.g., documents) that include electronic document(s) and/or can access node(s), of a knowledge graph, that are associated with source(s) of the target electronic document. The additional resource engine 120 can identify documents that: originate from the source(s) of the target electronic document (and optionally restrict searching to the source(s)); explain source perspective portion(s) of the target electronic document; and/or are related to content of the source perspective portion(s) of the target electronic document. In some versions of those implementations, candidate segments can be generated based on portions of additional documents that are identified by the additional resource engine 120. The additional resource scorer 125 can apply, as input across the trained machine learning model, each of the candidate segments and the source perspective portion(s) for each of the source(s) to generate the relatedness scores.

For example, assume a news article authored by John Smith includes a portion of "the University of Blue basketball team is the best team in the nation", and that the portion is identified as a source perspective portion by source perspective identification engine 115. Further assume that 100 news articles, blog posts, and social media posts authored by John Smith are identified by the additional resource engine 120. Various candidate segments from the news articles, blog posts, and social media posts authored by John Smith that explain a source perspective for John Smith with respect to the source perspective portion "the University of Blue basketball team is the best team in the nation" can be generated and processed to identify a basis for understanding of source perspective(s) of the source perspective portion(s) as opposed to only providing more detail on the underlying topic(s) of the source perspective portion(s). In this example, further assume that one of the news articles includes a candidate segment of "the University of Blue basketball team has the best recruiting class ever", that one of the blog posts includes a candidate segment of "the University of Blue basketball team beat the #1 basketball team in the nation", that one of the social media posts includes a candidate segment of "I have courtside seats because of my donation to University of Blue" along with a photo of the seats. The candidate segments from each of these documents (or candidate segments can be generated based on the these portions (e.g., "John Smith is a donor of University of Blue" based on the social media post)) can be processed (e.g., iteratively or as a batch), along with the source perspective portion of "the University of Blue basketball team is the best team in the nation", using the trained machine learning model, to determine a relatedness score. In some implementations, the relatedness score can be for a corresponding one of the additional document(s). For example, a relatedness score can be determined for each of the 100 news articles, blog posts, and social media posts authored by John Smith. In some implementations, the relatedness score can be for portion(s) of a corresponding one of the additional document(s). For example, a relatedness score can be determined for only candidate segments of a corresponding additional document (e.g., relatedness score for only "the University of Blue basketball team has the best recruiting class ever" from the news articles), as opposed for the corresponding additional document as a whole. In some further versions of those implementations, the relatedness score can be a total relatedness score for a corresponding additional document, where the total relatedness score is based on a combination on relatedness scores for candidate segments in the corresponding additional documents. For example, if the news article authored by John Smith includes candidate segments of "the University of Blue basketball team has the best recruiting class ever" and "the University of Blue basketball team will not lose a game this year", then a relatedness score for each of these candidate segments can be determined and combined to determine a total relatedness score for the news article. Thus, the relatedness score for the candidate segment of "I have courtside seats because of my donation to University of Blue" (or the candidate segment of "John Smith is a donor of University of Blue" generated based on the social media post) may indicate that it best explains John Smith's perspective (e.g., "the University of Blue basketball team is the best team in the nation") even though it is not directly related to the topic of John Smith's perspective, whereas the relatedness score for the candidate segment of "the University of Blue basketball team beat the #1 basketball team in the nation" may not indicate that it provides an explanation for John Smith's perspective even though it is directly related to the topic of John Smith's perspective.

As another example, again assume a news article authored by John Smith includes a portion of "the University of Blue basketball team is the best team in the nation", and that the portion is identified as a source perspective portion by source perspective identification engine 115. Further assume that a knowledge graph including nodes for "John Smith", "University of Blue", "Example Sports Radio Network", "basketball team", "basketball rankings", and "news article" is identified by the additional resource engine 120. In this example, the node for "John Smith" can be connected to the node for "University of Blue" by edges of an "alumnus of" and "donor of", the node for "John Smith" can also be connected to the node for "Example Sports Radio Network" by an edge of an "works for", the node for "John Smith" can also be connected to the node for "news article" by an edge of an "authored by", the node for "University of Blue" can be connected to the node for "basketball team" by an edge of an "has a", the node for "Example Sports Radio Network" can be connected to a node for "University of Blue" by a "writes about", the node for "University of Blue" and the node for "basketball rankings" can be connected by an edge of "#10", and so on to define relationships between source(s) (e.g., John Smith), documents (e.g., news article), and/or other entities (e.g., University of Blue, Example Sports Radio Network, basketball team, and so on). Various candidate segments from the knowledge graph that explain a source perspective for John Smith with respect to the source perspective portion "the University of Blue basketball team is the best team in the nation" can be generated and processed to identify a basis for understanding of source perspective(s) of the source perspective portion(s) as opposed to only providing more detail on the underlying topic(s) of the source perspective portion(s). In this example, candidate segments can be generated from the knowledge graph, and can include, for example, candidate segments of "John Smith is an alumnus of University of Blue", "John Smith is a donor of University of Blue", "University of Blue is #10 in basketball rankings", and so on. The candidate segment of "John Smith is an alumnus of University of Blue" can be generated based on the connection of the node for "John Smith" being connected to the node for "University of Blue" by an edge of "alumnus of", the candidate segment of "John Smith is a donor of University of Blue" can be generated based on the connection of the node for "John Smith" being connected to the node for "University of Blue" by an edge of "donor of", and so on. Each of these candidate segments can be processed (e.g., iteratively or as a batch), along with the source perspective portion of "the University of Blue basketball team is the best team in the nation", using the trained machine learning model, to determine a relatedness score for each of the candidate segments and the corresponding additional resources. Thus, the relatedness score for the candidate segment of "John Smith is a donor of University of Blue" may indicate that it best explains John Smith's perspective (e.g., "the University of Blue basketball team is the best team in the nation") even though it is not directly related to the topic of John Smith's perspective, whereas the relatedness score for the candidate segment of "University of Blue is #10 in basketball rankings" may not indicate that it provides an explanation for John Smith's perspective even though it is directly related to the topic of John Smith's perspective.

For each of the additional resources with a relatedness score that satisfies a threshold, additional content determination engine 135 defines a relationship between additional content generated from each of those additional resources and the target electronic document. A relationship between additional content from an additional resource and a target electronic document can be stored in a database, such as database 112. For example, referring again to FIG. 2, additional content from a document that indicates that the author (i.e., "Jim Smith") is a travel agent that specializes in travel to Thailand can be stored with a relationship to the target electronic document and/or to source perspective portion 205. Storing the relationship in the database 112 can occur prior to a subsequent retrieval of the target electronic document by a computing device of a user, and enable quick and efficient retrieval of the additional content for provisioning of the additional content (for rendering along with the target electronic document). Moreover, storing the relationship in the database 112 enables the relationship to be stored once, but utilized for many subsequent retrievals of the target electronic document. This can conserve significant resources compared to, for example, if the relationship was not stored and additional content not rendered—and manual searches for determining whether the target electronic document included source perspective content instead occurred.

In various implementations, additional content determination engine 135 only stores a relationship between the additional content of an additional resource and the target electronic document if the relatedness score satisfies a threshold. For example, additional resource scorer 125 can determine a relatedness score between additional content from an additional resource and the target electronic document that is a binary score (e.g., "1" for related and "0" for unrelated), and store the relationship if the relatedness score is a "1". Also, for example, a determined relatedness score can include a range of values, with a higher value indicating that the additional content is more indicative of relatedness than a relatedness score that is a lower number (e.g., "0.9" indicating additional content that is more related to a target electronic document than additional content with a score of "0.3"). In such an example, the additional resource scorer 125 can store the relationship if the relatedness score is greater than "0.6", or other value.

In some implementations, additional content engine 135 defines a relationship between additional content and the target electronic document as a whole. For example, additional content engine 135 can associate document 200 with additional content that is identified by additional resource engine 120. In some implementations, additional content determination engine 135 can define a relationship in database 112 that is between a source perspective portion of the target electronic document and additional content. For example, referring again to FIG. 2, content determination engine 135 can define a relationship between portion 205 and additional content from a first additional resource. Further or alternatively, additional content determination engine 135 can define a second relationship between portion 210 and additional content from a second additional resource (or a relationship between portion 210 and additional content from the first additional resource). Each of the defined relationships can be stored in database 112 and later accessed to render the additional content with the target electronic device.

In some implementations, additional content can be the entire additional resource. For example, the additional content can be the entire resource such that the entire additional resource can be rendered with the target electronic document, as described herein. In some implementations, additional content can include a portion of the related additional resource. For example, rather than associating an entire additional resource with the target electronic document, the relationship between a phrase from the additional resource that is related to the target electronic document (or a source perspective portion of the target electronic document) can be stored in database 112.

In some implementations, additional content can include a selectable portion, such as a link, to the additional resource. A link can be associated with, for example, a location of the additional resource. For example, the link can be associated with web address of an additional resource and by selecting the link, at least a portion of the additional resource can be rendered. Alternatively or additionally, the link can be a reference to a database entry, a directory on a computing device, and/or other link that allows a user to access the specific additional resource.

In some implementations, additional content can include a summary of the related additional resource. For example, one or more phrases and/or portions of the additional resource can be utilized to generate a summary of the contents of the additional resource. In some implementations, an additional resource can include a summary, which can then be identified as the additional content of the additional resource. For example, the additional resource can be an article that includes a summary at the start of the article. Also, for example, an additional resource can include a biography of the author at the end of the document (e.g., a short biography of the reporter at the end of a news story), and the biography utilized as the summary.

In some implementations, additional content can be generated from two or more additional resources. For example, a first additional resource and a second additional resource can both have relatedness scores that satisfy a threshold. Additional content determination engine 135 can generate additional content that is based on first content from the first additional resource and second content the second additional resource. For example, additional content can include a source perspective summary that is generated based on content from two or more additional resources.

As an example, a first additional resource can include the phrase "Jim Smith is a travel agent specializing in trips to Thailand." Further, a second additional resource can be a biography of the author and include the phrase "He has been to Thailand over 20 times." Additional resource scorer 125 can determine relatedness scores for both additional resources that satisfy a threshold. Content from the first additional resource and content from the second additional resource can be utilized to generate additional content (e.g., a source perspective summary) that can be associated with the target electronic document and/or source perspective portions of the target electronic document in database 112.

As an example, referring again to FIG. 2, for the portion 205 of document 200, additional content determination engine 135 can identify all additional resources (or portions of additional resources) that satisfy a threshold as related to the portion 205. Further, additional content determination engine 135 can generate a summary that includes content from each of the additional resources, such as a source perspective summary for portion 205 that indicates "Jim Smith" may be biased towards Thailand because the only foreign country that he has been known to visit is Thailand. Further, Mr. Smith is a travel agent that specializes in booking trips to Thailand." The resulting source perspective summary includes content from a first resource (e.g., the author has traveled to only Thailand) and content from a second resource (e.g., the author is a travel agent specializing in Thailand travel).

Additional content renderer 130 causes the computing device of the user to render the additional content that is associated with the target electronic document in the database 112. The additional content is rendered simultaneously with the target electronic document so that the user, upon viewing the target electronic document, can view the additional content.

Additional content renderer 130 causes a computing device to render, along with the target electronic document, corresponding additional content determined by the additional content determination engine 135. For example, a user can select a document to view, and the document can be associated with additional content. Additional content renderer 130 can render the selected document (i.e., the target electronic document) along with the associated additional content, as described herein.

In some implementations, the additional content can be related to a particular source perspective portion of the target electronic document and the additional content renderer 130 can render the target electronic document with an indication that additional content is available and relevant to the particular source perspective portion of the target electronic document. The source perspective portion of the target electronic document can be rendered such that it is distinguishable from the rest of the document (e.g., underlined, bold-faced, capitalized, rendered in a different color) so that the reader can recognize that additional content is available for that portion of the document.

Figure 3:
FIG. 3 illustrates an example interface that includes a target electronic document rendered with biased portions that are associated with additional content highlighted.

In some implementations, additional content renderer 130 can render a selectable interface element that indicates additional content relevant to a source perspective is available without rendering the additional content. For example, referring to FIG. 3, a target electronic document is provided with indications that additional content is available without rendering the additional content. As illustrated, the document 300 includes a first source perspective portion 305 that is highlighted in bold face font to indicate that additional content related to the source perspective portion 305 and/or to the entire target electronic document is available. The document 300 further includes a second source perspective portion 310 that is also highlighted to indicate that the statement may be include a source perspective and that additional content is available. In some implementations, the first portion 305 can be associated with different additional content than the second portion 310 (i.e., each source perspective portion is associated with different additional resources). In some implementations, multiple source perspective portions of a target electronic document can be associated with the same additional content. For example, additional content can be associated with the entire target electronic document (and not to a specific source perspective portion of the document). Thus, multiple source perspective portions in the document can be rendered with the same additional content that is relevant to all of the additional content. In some implementations, the source perspective portions can be selectable and the additional content may render upon selecting, as described herein with regard to FIG. 4.

In some implementations, additional content renderer 130 can render the target electronic document graphically associated with a source perspective summary that is generated based on identified related additional resources. For example, multiple additional resources can be related to a source perspective portion of the target electronic document and a source perspective summary can be generated based on the content of the additional resources, as previously described. Additional content renderer 130 can render the target electronic document with one or more graphical indications that a summary is available for a source perspective portion of the document.

In some implementations, the target electronic document can include one or more selectable portions that, when selected, cause at least a portion of one or more of the associated additional resources to be rendered. For example, a source perspective portion of the target electronic document can be associated with additional content that is generated from Document A and a portion of Document A, such as the most relevant portion, can be rendered with the target electronic document. Additionally, the target electronic document can include a link in the additional content to allow a reader to select the link and be provided with the entire Document A or an expanded portion of Document A.

As another example, a source perspective summary can be generated based on content of Document A and Document B. Additional content renderer 130 can render the source perspective summary or a portion of the source perspective summary with the target electronic document and the additional content can include the source perspective summary rendered with links to Document A and Document B. Thus, the user can select one of the links and be provided with the corresponding document and/or a relevant portion of the corresponding document.

In some implementations, the source perspective summary or additional content can be rendered in a separate section of the interface as the target electronic document. For example, referring to FIG. 4A, the target electronic document 400 is rendered by additional content renderer 130 in a first section of the interface. Additional content interface 405 includes rendered versions of the additional content and/or of a source perspective summary generated from additional resources. In some implementations, as illustrated, the additional content and/or source perspective summary can be provided with an indication of the source perspective portion of the target electronic document that is associated with the content and/or summary. For example, source perspective portion 410 is aligned with additional content 415 to inform the reader that the additional content 415 is relevant to the source perspective portion 410. As illustrated, the source perspective portion 410 is further highlighted to indicate that the statement may include a source perspective, further informing the reader that additional content is included with the target electronic document. In some implementations, additional and/or alternative indications can be utilized to indicate which source perspective portion is associated with additional content and/or a source perspective summary (e.g., an arrow and/or other indicator extending from the additional content and pointing to a source perspective portion, color coding of additional content and source perspective portions).

As another example, source perspective portion 420 is associated with source perspective summary 425 based on alignment of the source perspective summary 425 with the source perspective portion 420. Source perspective summary 425 includes a textual summary as well as a listing of links 435 to documents that were utilized to generate the source perspective summary 430. Thus, the reader can select one of the links to be provided with the corresponding document and/or a portion of the corresponding document that is relevant to the source perspective portion 420.

Figure 4B:
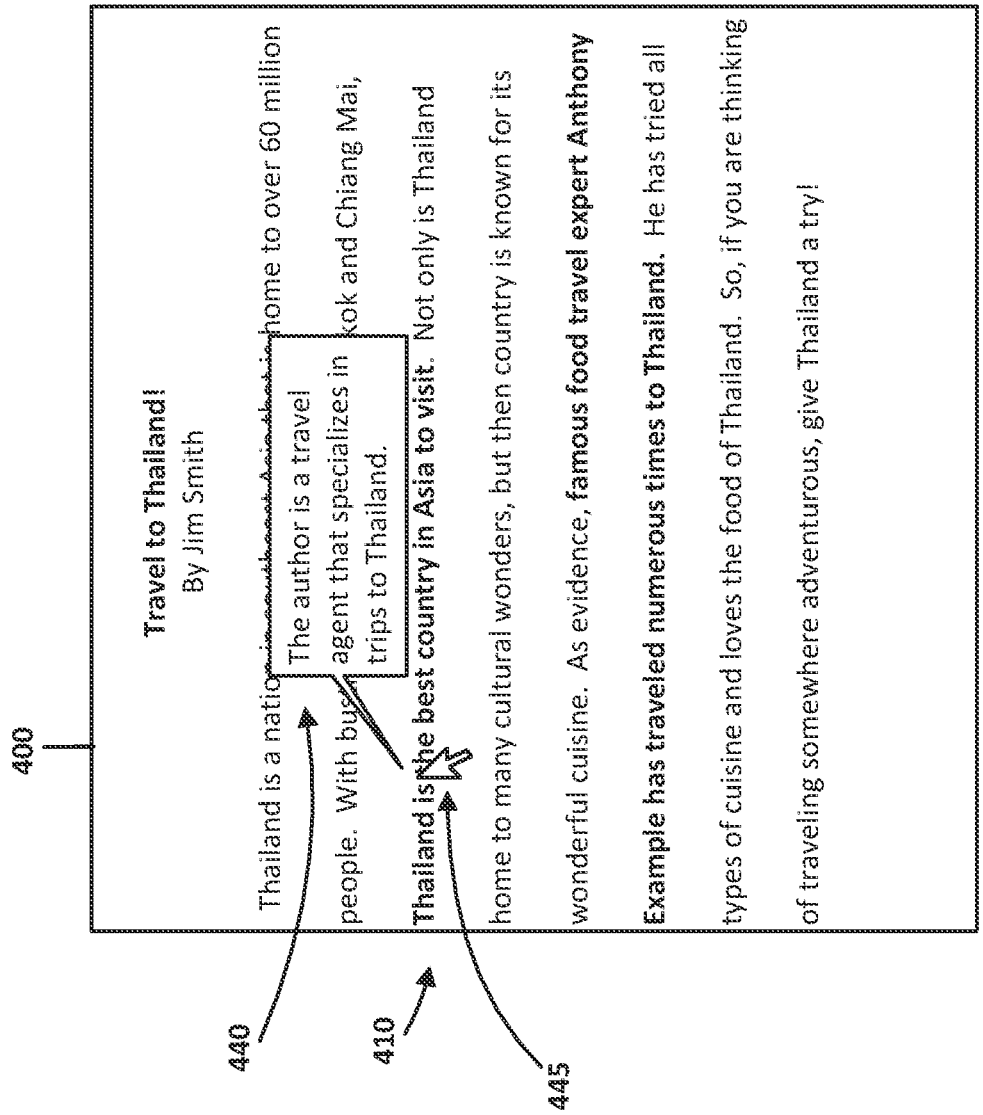
FIG. 4B illustrates an example of additional content rendered based on affirmative input by the user.

In some implementations, the source perspective summary and/or additional content may be rendered in a separate interface from the target electronic document. For example, referring to FIG. 4B, the same target electronic document as illustrated in FIG. 4A (i.e., document 400) is rendered without the additional content and/or the source perspective summary rendered with the document. As illustrated, a cursor 445 is hovering over source perspective portion 410 and a pop-up window 440 is rendered upon hovering over (or selecting) the source perspective portion. The pop-up window provides additional content that is associated with the source perspective portion 410. In some implementations, a source perspective summary can be rendered in the same manner. For example, a source perspective summary can be rendered with a summary or rendered with both a summary and additional selectable portions that, when selected, render at least a portion of one or more of the additional resources that were utilized to generate the source perspective summary (e.g., a pop-up window that includes the same information and links as additional content 425 of FIG. 4A).

In various implementations, additional content renderer 130 can be implemented (in whole or in part) by a corresponding one of the application(s) 107, can be installed as an extension of a corresponding one of the application(s) 107, and/or can interface (e.g., via an API) with a corresponding one of the application(s) 107. In response to accessing a given target electronic document via one of the application(s) 107, the additional content renderer 130 can access database 112 to determine whether the given target electronic document includes an entry in the database 112. For example, the database 112 can include an index of the entries based on URLs and/or other identifiers, and the additional content renderer 130 can search the index to determine whether an entry is present for the given target electronic document. If so, the additional content renderer can modify rendering of the given target electronic document, utilizing one or more techniques described herein. For example, the entry can include an indication of the source perspective portion(s) of the given electronic document, and such an indication utilized by the additional content renderer 130 to alter those source perspective portions such that they are highlighted, bolded, or otherwise demarcate as a queue to the user that they may potentially include a source perspective. Also, for example, the entry can include an indication of additional content related to the source perspective portion(s) of the given electronic document, and the additional content renderer can cause the additional content to be automatically rendered, or cause it to be rendered in response to certain user input (e.g., a selection or hovering over a source perspective portion). The additional content rendered 130 can modify the rendering of the target electronic document to cause rendering of the additional content and/or can monitor for certain user input and cause the rendering to occur in response to the certain user input.

Figure 5:
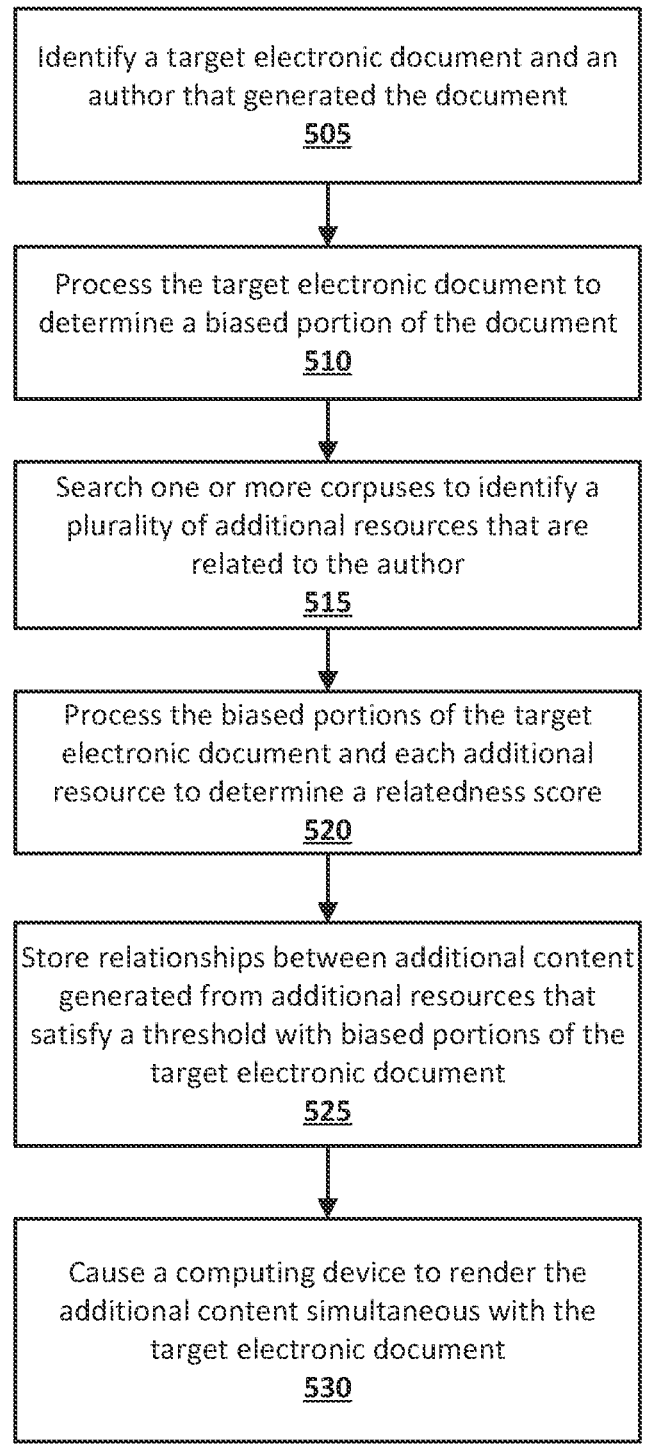
FIG. 5 illustrates a flowchart of an example method for rendering an electronic document with additional content and/or a bias summary associated with a biased portion of the target electronic document.

FIG. 5 illustrates a flowchart of an example method for rendering additional content related to a biased portion of a document. The steps of FIG. 5 can be performed by one or more processors, such as one or more processors of a client device. Other implementations may include additional steps than those illustrated in FIG. 5, can perform step(s) of FIG. 5 in a different order and/or in parallel, and/or may omit one or more of the steps of FIG. 5. The steps of FIG. 5 are described with respect to a source that is an author of a target electronic document. However, implementations of FIG. 5 can be performed with respect to other source(s) such as a publisher, a creator, or a combination of a publisher, creator, and/or author. Although FIG. 5 is described herein as rendering additional content related to a biased portion of a document, it should be understood that is for exemplary purposes and is not meant to be limiting. Further, it should be understood that the steps of FIG. 5 can be performed in rendering additional content related to any source perspective of a document for any number of different sources of the document.

At step 505, a target electronic document and an author of the document are identified. The target electronic document can be identified based on a user navigating to the document. For example, the user can utilize one or more components of computing device 105 to select a document to view. The target electronic document can additionally or alternatively be identified as part of a crawling procedure, or based on being previously crawled and identified by the crawling procedure. Based on the content of the document and/or based on metadata associated with the document, one or more components can determine an author that generated the target electronic document. For example, a document can include a header and/or footnote that identifies a person as the author. Also, for example, metadata associated with the document can include author information.

At step 510, the target electronic document is processed to determine a biased portion of the document. The biased portion can be determined by a component that shares one or more characteristics with source perspective identification engine 115. For example, source perspective identification engine 115 can identify as biased based on term(s) included in the portion (e.g., statements with "best," "greatest," "I think," etc.). Also, for example, source perspective identification engine 115 can additionally or alternatively determine a portion of the document is biased by processing the portion utilizing a machine learning model, generating a measure based on the processing, and determining the measure satisfies a threshold that indicates likely bias.

At step 515, one or more corpuses are searched to identify a plurality of additional resources that are related to the author. The additional resources can be identified by a component that shares one or more characteristics with additional resource engine 120. The additional resources can include, for example, other documents generated by the author, other documents that mention the author, documents related to others that are mentioned by the author, and/or other resources that have a relation to the author.

At step 520, features of each of the additional resources and the biased portion of the target electronic document are processed to generate a relatedness score for each of the additional resources. The relatedness score can be generated by a component that shares one or more characteristics with additional resource scorer 125. For example, additional resource scorer 125 can provide the biased portion of the target electronic document and one or more of the resources as input to a machine model and utilize the output of the trained machine learning model to generate a relatedness score between the biased portion and the additional resource. In some implementations, additional resource scorer 125 can generate a relatedness score that is a binary score (e.g., "1" for related, "0" for unrelated). In some implementations, additional resource scorer 125 may can a relatedness score that is non-binary and that is representative of a level of relatedness between the additional resource and the biased portion.

At step 525, relationships between additional content generated from the additional resources and the biased portion of the target electronic document are stored in a database for those additional resources with relatedness scores that satisfy a threshold. The relationships can be stored in a database that shares one or more characteristics with database 112. In some implementations, the relationship can be between the entire target electronic document and additional content generated from one or more additional resources. In some implementations, the relationship may be between a particular biased portion of the target electronic document and the additional content.

At step 530, one or more components cause a computing device that is rendering the target electronic document to render the additional content simultaneously with the target electronic document. In some implementations, a component that shares one or more characteristics with additional content renderer 130 can cause the computing device to render the additional content with the target electronic document. For example, additional content renderer 130 can cause the client device 105 to render the additional content along with the target electronic document, such as illustrated in FIG. 4A. In some implementations, additional content renderer 130 can cause the client device 105 to render the target electronic document with selectable portions associated with biased portions such that, upon selecting the selectable portion, the corresponding additional content is rendered in a separate interface, as illustrated In FIG. 4B.

Figure 6:
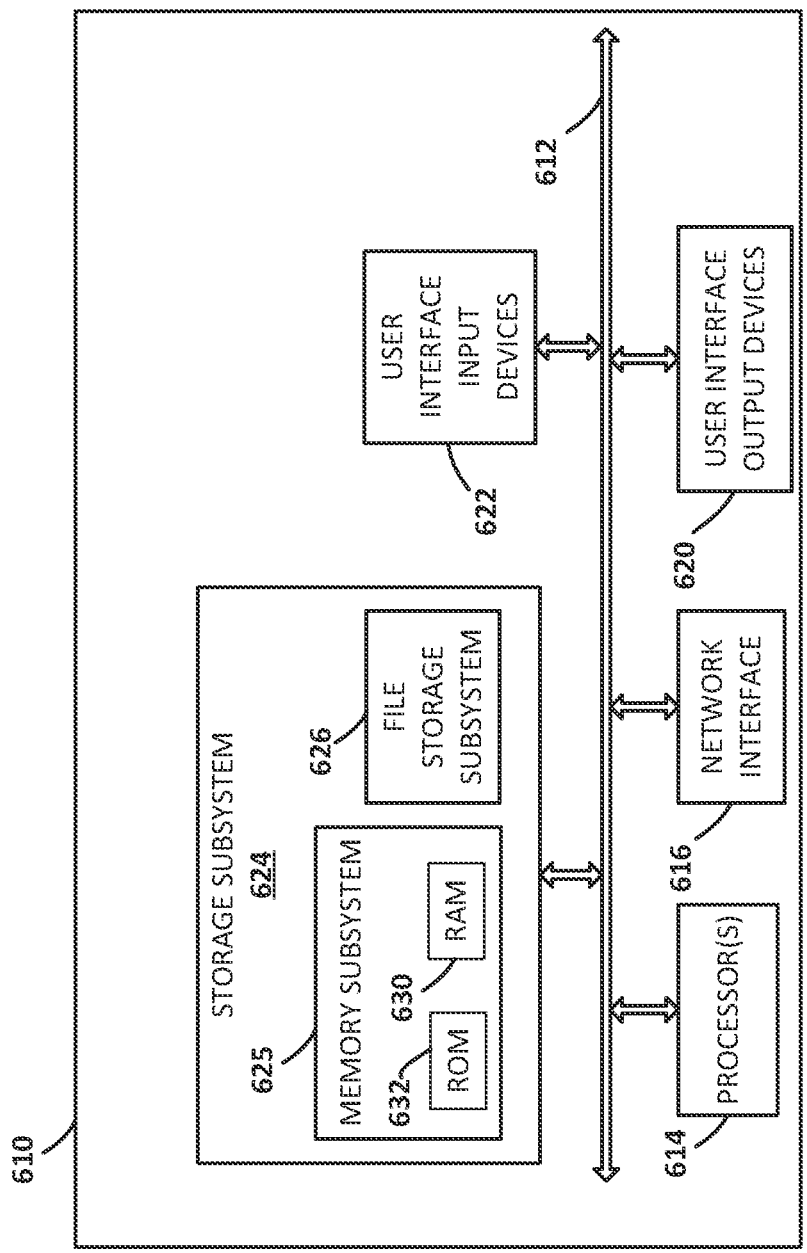
FIG. 6 illustrates an example architecture of a computing device.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods described herein, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

As described herein (e.g., with respect to FIGS. 4A and 4B), an additional content renderer (e.g., additional content renderer 130 of FIG. 1) can cause a computing device of a user to render additional content that is associated with a target electronic document. The additional content can be determined by an additional content determination engine (e.g., additional content determination engine 135 of FIG. 1), and can be rendered simultaneously with the target electronic document so that the user, upon viewing the target electronic document, can also view the additional content.

In some implementations, the additional content can be related to one or more source perspective portions of the target electronic document, and the additional content renderer can render the target electronic document with an indication that additional content is available and relevant to one or more of the source perspective portions of the target electronic document. The one or more source perspective portions of the target electronic document can be rendered such that they are distinguishable from the rest of the document (e.g., underlined, bold-faced, capitalized, encircled, rendered in a different color, etc.) so that the reader can recognize that additional content is available for one or more of the source perspective portions of the target electronic document.

In some implementations, the additional content renderer can render a selectable interface element that indicates additional content relevant to one or more of the source perspective portions is available without rendering the additional content. In some versions of those implementations, one or more of the source perspective portions of the target electronic document can be selectable and the additional content may be rendered upon the selecting. For example, as described with respect to FIG. 3, a target electronic document can be provided along with indications that additional content is available without rendering the additional content simultaneously with the target electronic documents. In some implementations, multiple source perspective portions of a target electronic document can be associated with the same additional content. For example, additional content can be associated with a publisher and/or creator of the entire target electronic document (and not to a specific source perspective portion of the document penned by an author). Thus, the target electronic document can be rendered along with multiple source perspective portions that are relevant to an author, publisher, and/or creator of the target electronic document.

In some implementations, the additional content renderer can render the target electronic document graphically along with a source perspective summary for an author, publisher, and/or creator of the target electronic document, where the source perspective summary is generated based on identified additional resources that are related to one or more source perspective portions of the target electronic document. For example, multiple additional resources can be related to a source perspective portion of the target electronic document penned by an author, a source perspective of a publisher that published the target electronic document, and/or a source perspective of a creator that collated the targeted electronic document, and a corresponding source perspective summary for the author, publisher, and/or creator can be generated based on the content of the additional resources. The additional content renderer can render the target electronic document along with one or more graphical indications that a corresponding source perspective summary is available for one or more biased portions of the document penned by an author, a source perspective of a publisher that published the target electronic document, and/or a source perspective of a creator that collated the targeted electronic document.

In some implementations, a source perspective summary can be generated based on features and/or content of a plurality of additional resources that are related to the target electronic document. The plurality of additional resources can be stored in one or more corpuses that are searchable. The additional content renderer can render the source perspective summary or a portion of the source perspective summary along with the target electronic document, and the source perspective summary can be rendered with links to one or more of the plurality of additional resources used in generating the source perspective summary. Thus, the user can select one of the links and be provided with a corresponding one of the plurality of additional resources. In some implementations, the source perspective summary can be rendered in a separate section of an interface as the target electronic document (e.g., as described with respect to FIGS. 4A and 7A). In other implementations, the source perspective summary can be rendered in a separate interface from the target electronic document (e.g., as described with respect to FIGS. 4B and 7B).

Moreover, the source perspective summary can provide an explanation of a perspective for at least one source of a target electronic document. The at least one source can include an author of the target electronic document, the publisher of the target electronic document, and/or a creator of the target electronic document. The author of the target electronic document can be the individual that penned content of the target electronic document and/or generated other portions (e.g., images) of the target electronic document. For example, a person who pens a news article or creates a caricature for the news article can be considered an author of the news article. The publisher of the target electronic document can be, for example, a website, magazine, news outlet, corporation, and/or other entities that hosts, prepares, and/or facilitates dissemination of the target electronic document. For example, a news agency that prepares and/or publishes a news article can be considered the publisher of the news article. The creator of the target electronic document can be one or more individuals that collated content of the document (e.g., re-publishes the target electronic document on a corresponding web site, shares the target electronic document via a social media account associated with the creator, and/or other forms of collating the target electronic document), but that didn't necessarily originally author and/or originally publish the target electronic document. For example, a second news agency that publishes a news article (or slight variation thereof) that was originally published and/or prepared by a first news agency collates the news article can be considered the creator of the news article even though the second news agency did not originally author and/or originally publish the news article.

Further, the source perspective summary for the at least one source of the target electronic document can be based on content and/or additional resource features of a plurality of additional resources that are related to the at least one source and/or related to a source perspective portion of the target electronic document. In other words, the source perspective summary for a source of the target electronic document can be based on other related documents penned by the author (when the author is the source), other related documents published by the publisher (when the publisher is the source), and/or other related documents collated by the creator (when the creator is the source). For example, an author perspective summary for an author can provide an explanation of a source perspective portion (e.g., biased portion, opinionated portion, and/or other subjective portion) of a target electronic document with respect to the author, and can be generated based on features of other documents penned by the author that include content related to the biased portion of the target electronic document. As another example, a publisher perspective summary for a publisher can provide an explanation of source perspective portion (e.g., biased portion, opinionated portion, and/or other subjective portion) of a target electronic document with respect to the publisher, and can be generated based on features of other documents published by the publisher that include content related to the target electronic document. In this example, the other documents can be penned by the same author or different authors. As yet another example, a creator perspective summary for a creator can provide an explanation of a source perspective portion (e.g., biased portion, opinionated portion, and/or other subjective portion) of a target electronic document with respect to the creator, and can be generated based on features of other documents collated by the creator that include content related to the target electronic document. Accordingly, the source perspective summary can provide an explanation of perspective from the at least one source of the electronic target document based on other documents associated with the at least one source, as opposed to being based on other documents that include content related to the source perspective portions of the target electronic document, but are not associated with the at least one source.

In various implementations, the additional resources that are related to the at least one source and/or related to the source perspective portion of the target electronic document can be identified by searching one or more corpuses. The one or more corpuses can include different types of additional resources, such as new articles, blog posts, social media posts, and/or types of documents. In some implementations, multiple source perspective summaries can be generated for the at least one source for each of the different types of additional resources. In some versions of those implementations, a first portion of the source perspective summary for the at least one source can be generated based on a first type of additional resources and a second portion of the source perspective summary for the at least one source can be generated based on a second type of additional resources. For example, a first portion of the source perspective summary for a publisher can be generated based on features of news article that are related to a target news article published by the publisher, and a second portion of the source perspective summary for the publisher can be generated based on social media posts and/or interactions therewith for a social media account associated with the publisher.

In some implementations, a single source perspective summary can be generated for the at least one additional source. In some versions of those implementations, a source perspective of the at least one source can be weighted by one or more weighting factors based a type of the additional resources. For example, if an author is a travel agent that pens an article about international travel destinations and that includes a source perspective portion of "Thailand is the best country in Asia to visit", then the article can be weighted by a weighting factor of 1.0 to indicate the article is highly indicative of the author's perspective. In contrast, if the author pens a social media post that includes a source perspective portion of "Thailand is the coolest country in Asia to visit", then the social media post can be weighted by a weighting factor of 0.7 to indicate the article is indicative of the author's perspective, but not as indicative of the author's perspective as the news article. In other implementations, each type of the additional resources can be weighted equally.

Moreover, the source perspective summary can include an explanation of the source perspective for the at least one source of the target electronic document that informs a user consuming the target electronic document as to a perspective of the at least one source (e.g., an author that penned the target electronic document, a publisher that published the target electronic document, and/or a creator that collated the target electronic document). In some implementations, the source perspective summary includes various portions for the at least one source. Each of these portions of the source perspective summary can include different manners of explaining the perspective for the at least one source of the target electronic document. In some versions of those implementations, a first portion of the source perspective summary can be presented to the user consuming the target electronic document as one or more natural language explanations (e.g., words, phrases, and/or sentences) generated based on features of additional resources related to the target electronic document. In additional and/or alternative versions of those implementations, a second portion of the source perspective summary can be presented to the user consuming the target electronic document as one or more source perspective metrics generated based on features of additional resources related to the target electronic document and from the same source(s). The one or more source perspective metrics can include, for example, one or more source perspective percentages that indicate how often the at least one source portrays content included in source perspective portion(s) of the target electronic document in a particular manner (e.g., positively, negatively, and/or other manner), one or more source perspective statistics (e.g., mean, median, standard deviation, and/or or other source perspective statistics) that indicate how content included in source perspective portion(s) of the target electronic document includes a given perspective compared to source perspective portions of other documents from the at least one source, one or more visual representations (e.g., pie graph, bar graph, and/or other visual representations) that indicate how often the at least one source portrays content included in the source perspective portions of the target electronic document in a particular manner, and/or other source perspective metrics. In some additional and/or alternative versions of those implementations, a third portion of the source perspective summary can include a listing of links to one or more of the additional resources that were utilized to generate a natural language explanation for the source perspective summary and/or utilized to generate source perspective metrics for the source perspective summary. Each link included of the listing of links can, when selected, cause a computing device navigate to a corresponding additional resource (or a particular portion of the corresponding additional resource associated with the explanation for the source perspective) that was utilized to generate the natural language explanation for the source perspective summary and/or utilized to generate the source perspective metrics for the source perspective summary. The links in the listing of links can also be represented as hyperlinked text that, when selected, causes the computing device to navigate to the corresponding additional resource. Thus, the source perspective summary can include various explanations of different perspectives for the at least one source of the target electronic document.

Figure 7A:
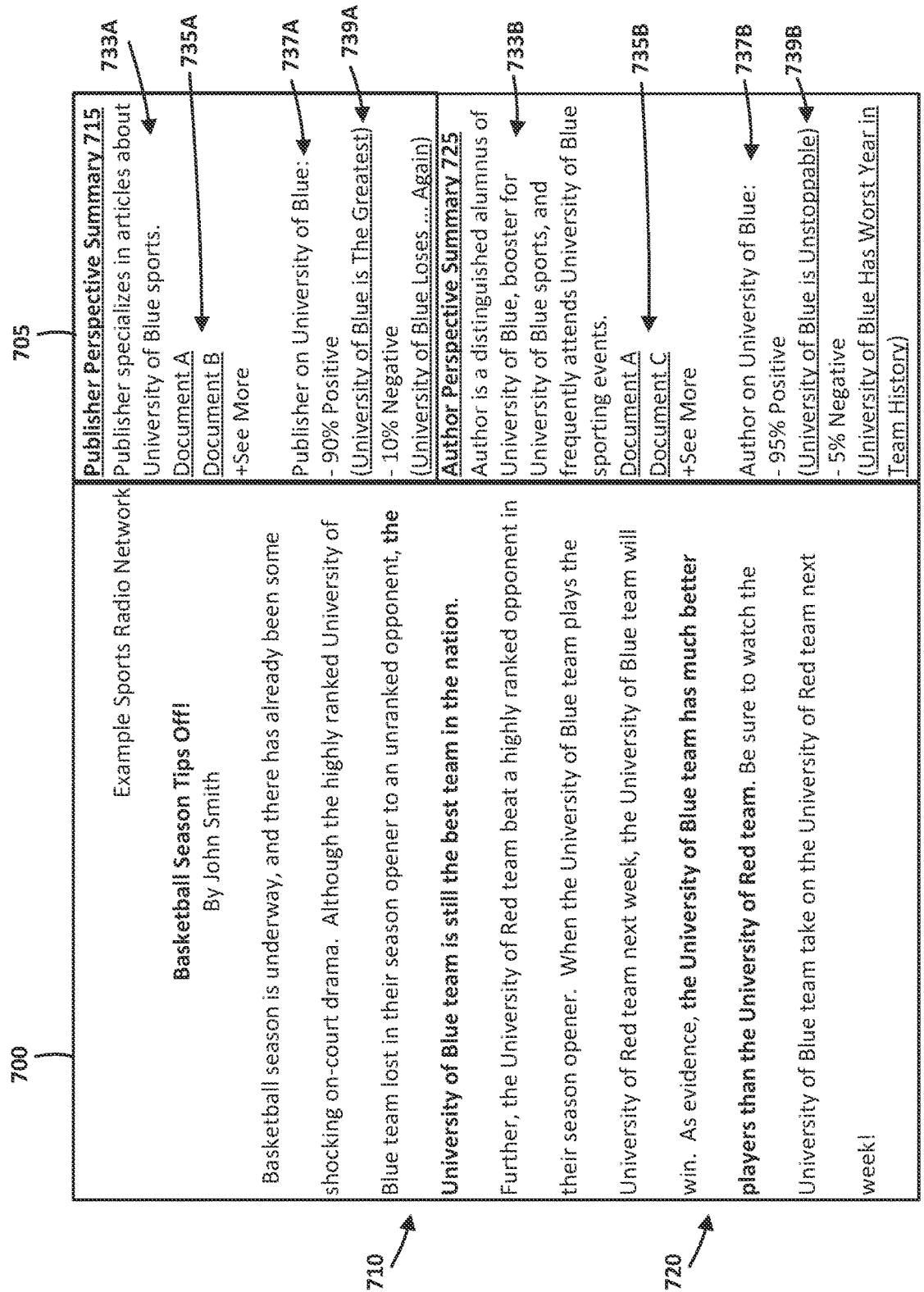
FIG. 7A illustrates an example interface that includes a bias summary.

In some implementations, the source perspective summary may be rendered in a separate interface from the target electronic document. For example, referring to FIG. 7A, a target electronic document 700 is rendered by an additional content renderer (e.g., additional content renderer 130 of FIG. 1) in a first section of an interface. The target electronic document 700 of FIG. 7A is entitled "Basketball Season Tips Off!" authored by "John Smith", and published by "Example Sports Radio Network". Notably, the target electronic document 700 is a news article that includes a bias towards University of Blue's basketball team as indicated by biased portions 710 and 720. In some implementations, as illustrated, the target electronic document 700 can be provided with an indication of the source perspective portions 710 and 720 of the target electronic document 700. For example, source perspective portions 710 and 720 are bolded to inform the user consuming the target electronic document that statements included in the target electronic document 700 may be influenced by a source's perspective. Other techniques for graphically demarcating the source perspective portions 710 and 720 can be utilized, and can include, for example, encircling, underlining, highlighting, and/or other manners of graphically demarcating the source perspective portion(s) of the target electronic document.

Additional content interface 705 includes rendered versions of a Publisher Perspective Summary 715 and an Author Perspective Summary 725 generated based on features of additional resources related to content of the source perspective portions 710 and 720. In some implementations, the additional content interface 705 can be rendered simultaneously with the target electronic document 700. In other implementations, the additional content interface 705 can be rendered responsive to receiving an indication to view the additional content interface 705. For example, a user may click, highlight, underline, or otherwise select one or more of the source perspective portions 710 and 710, and the additional content interface 705 can be rendered responsive to the selection. As another example, the target electronic document can be rendered along with one or more selectable elements that, upon selection, renders the additional content interface 705 along with the target electronic document 700, and that, upon an additional selection, remove the additional content interface 705. In this manner, the additional content interface 705 can be toggled on and off for consumption by a user.

For the Publisher Perspective Summary 715, an additional content determination engine (e.g., additional content determination engine 135 of FIG. 1) can search one or more corpuses to identify additional resources related to content the source perspective portions 710 and 720. The identified additional resources can include (or be restricted to) other documents prepared and/or published by Example Sports Radio Network, social media posts and/or interactions of a social media account associated with Example Sports Radio Network, and/or other additional resources associated with Example Sports Radio Network. The features of the identified additional resources enable a source perspective identification engine (e.g., source perspective identification engine 115 of FIG. 1) to generate a natural language explanation 733A for the Publisher Perspective Summary 715 that explains Example Sports Radio Network's perspective on the content, such as biases, opinions, assumptions, predispositions, and/or other perspectives (e.g., Example Sports Radio specializes in publishing articles about University of Blue sports). For example, the natural language explanation 733A for the Publisher Perspective Summary 715 can be generated based on content from additional resources that are related the source perspective portions 710 and 720 and/or explain the biases, opinions, and/or other subjective measures of Example Sports Radio Network.

Further, the Publisher Perspective Summary 715 can include a listing of links 735A to the additional resources that were utilized to generate the natural language explanation 733A for the Publisher Perspective Summary 715. The listing of links 735A includes a first link to Document A, a second link to Document B, and a selectable interface element that, when selected, enables a user consuming the target electronic document 700 to view more of the additional resources utilized in generating the natural language explanation 733A. In some implementations, the links included in the listing of links 735A include links that provide the greatest explanatory extent in generating the natural language explanation 733A (e.g., as described with respect to additional resource scorer 125). Thus, the user can select one of the links to be provided with the corresponding document and/or a particular portion of the corresponding document that is relevant to the source perspective portions 710 and 720. Further, the Publisher Perspective Summary 715 can also include publisher perspective metrics 737A (e.g., shown as publisher perspective percentages in FIG. 7A) for the publisher Example Sports Radio Network. The publisher perspective metrics 737A indicate that 90% of documents prepared and/or published by Example Sports Radio Network, social media posts shared/liked by a social media account associated with Example Sports Radio Network, and/or other features of additional resources related to the source perspective portions 710 and 720 portray the University of Blue basketball team in a positive manner, whereas only 10% portray the University of Blue basketball team in a negative manner. Further, the publisher perspective metrics 737A can be rendered along with corresponding hyperlinked text 739A. As shown in FIG. 7A, the hyperlinked text 739A enables a user to navigate to additional resources utilized in generating the publisher perspective metrics 737A for Example Sports Radio Network's positive portrayal of University of Blue (e.g., a news article titled "University of Blue is The Greatest") and for Example Sports Radio Network's negative portrayal of University of Blue (e.g., a social media post of "University of Blue Loses . . . Again"). Although the corresponding hyperlinked text 739A is depicted as hyperlinked text to a single additional resource for each of the publisher perspective metrics 737A, it should be understood that is for exemplary purposes and is not meant to be limiting. For example, the corresponding hyperlinked text 739A can also be rendered with a selectable interface element that, when selected, enables a user consuming the target electronic document 700 to view more of the additional resources utilized in generating the publisher perspective metrics 737A.

For the Author Perspective Summary 725, the additional content determination engine can search one or more corpuses to identify additional resources related to content the source perspective portions 710 and 720. The identified additional resources can include (or be restricted to) other documents penned by John Smith, social media posts and/or interactions of a social media account associated with John Smith, and/or other additional resources associated with John Smith. The features of the identified additional resources enable a source perspective identification engine to determine and generate a natural language explanation 733B for the Author Bias Summary 725 explaining John Smith's perspective on the content, such as biases, opinions, assumptions, predispositions, and/or other perspectives (e.g., John Smith is a distinguished alumnus of University of Blue, a booster for University of Blue sports, and frequently attends University of Blue sporting events). For example, the natural language explanation 733B for the Author Perspective Summary 725 can be generated based on content from additional resources that are related the source perspective portions 710 and 720 and/or explain the biases, opinions, and/or other subjective measures of John Smith.

Further, the Author Perspective Summary 725 can include a listing of links 735B to the additional resources that were utilized to generate the natural language explanation 733B for the Author Perspective Summary 725. The listing of links 735B includes a first link to Document A, a second link to Document C, and a selectable interface element that, when selected, enables a user consuming the target electronic document 700 to view more of the additional resources utilized in generating the natural language explanation 733B. In some implementations, the links included in the listing of links 735B include links that provide the greatest explanatory extent in generating the natural language explanation 733A (e.g., as described with respect to additional resource scorer 125). Thus, the user can select one of the links to be provided with the corresponding document and/or a particular portion of the corresponding document that is relevant to the source perspective portions 710 and 720. Further, the Author Perspective Summary 725 can also include author perspective metrics 737B (e.g., shown as author perspective percentages in FIG. 7A) for the author John Smith. The author perspective metrics 737B indicate that 95% of documents penned by John Smith, social media posts shared/liked by a social media account associated with John Smith, and/or other features of additional resources related to the source perspective portions 710 and 720 portray the University of Blue basketball team in a positive manner, whereas only 5% portray the University of Blue basketball team in a negative manner. Further, the author perspective metrics 737B can be rendered along with corresponding hyperlinked text 739B. As shown in FIG. 7A, the hyperlinked text 739B enables a user to navigate to additional resources utilized in generating the author perspective metrics 737B for John Smith's positive portrayal of University of Blue (e.g., a news article titled "University of Blue is Unstoppable") and for John Smith's negative portrayal of University of Blue (e.g., a social media post of "University of Blue Has Worst Year in Team History"). Although the corresponding hyperlinked text 739B is depicted as hyperlinked text to a single additional resource for each of the author perspective metrics 737B, it should be understood that is for exemplary purposes and is not meant to be limiting. For example, the corresponding hyperlinked text 739B can also be rendered with a selectable interface element that, when selected, enables a user consuming the target electronic document 700 to view more of the additional resources utilized in generating the author perspective metrics 737B.

Notably, in the example of FIG. 7A, the natural language explanations 733A for the Publisher Perspective Summary 715 is generated based on features (e.g., content, metadata, and/or other features) included in at least Document A and Document B, and the natural language explanation 733B for the Author Perspective Summary 725 is generated based on features (e.g., content, metadata, and/or other features) included in at least Document A and Document C. Thus, Document A is an additional resource that is published by Example Sports Radio Network and that is also authored by John Smith. However, Document B is an additional resource that is published by Example Sports Radio Network, but not authored by John Smith. Further, Document C is an additional resource that is authored by John Smith, but not published by Example Sports Radio Network. Even though Document B and Document C in FIG. 7A do not include the same author (e.g., John Smith) and the same publisher (e.g., Example Sports Radio Network) as the target electronic document 700 (like Document A in FIG. 7A), an additional content determination engine (e.g., additional content determination engine 135 of FIG. 1) can still identify each of these additional resources because they include content related to the source perspective portions 710 and 720 for the respective sources of the target electronic document.

Moreover, implementations that provide natural language explanations in the source perspective summary (e.g., natural language explanation 733A based on features of Document A and Document B, and natural language explanation 733B based on features of Document A and Document C), can result in a reduced quantity of user inputs (or even no user inputs) being needed to identify additional resources that explain source perspective portions of electronic documents. Those implementations additionally or alternatively result is conservation of client and/or network resources by rendering the natural language explanation along with a target electronic document in a single interface, and also allow "one-click" navigation to the additional resources utilized in generating the natural language explanation. Absent these techniques, further user input to conduct additional searches, opening of new tabs based on that search, and/or navigating to additional interfaces would be required.

Although FIG. 7A is depicted as including only the Publisher Perspective Summary 715 and the Author Perspective Summary 725, it should be understood that is for exemplary purposes and not meant to be limiting. For example, if the target electronic document 700 was also collated by a creator (e.g., as described with respect to FIG. 7B), then the additional interface 705 could additionally and/or alternatively include a creator perspective summary. The creator perspective summary can be generated and rendered in any manner described herein (e.g., with respect to FIGS. 1, 4A, 4B, 7A, and 7B). Moreover, although the Publisher Perspective Summary 715 and the Author Perspective Summary 725 of FIG. 7A are depicted as including various natural language explanations, source perspective metrics, and listings of links, it should be understood that the Publisher Perspective Summary 715 and/or the Author Perspective Summary 725 can include one of natural language explanations, source perspective metrics, listings of links, and/or any combination thereof to inform the user consuming the target electronic document of potential biases and explanations for the potential perspectives included in the target electronic document 700 and/or potential perspectives of a publisher and/or creator of the target electronic document 700. Further, in some implementations, the target electronic document 700 can include metadata indicative of source perspective(s) included in the target electronic document 700.

Figure 7B:
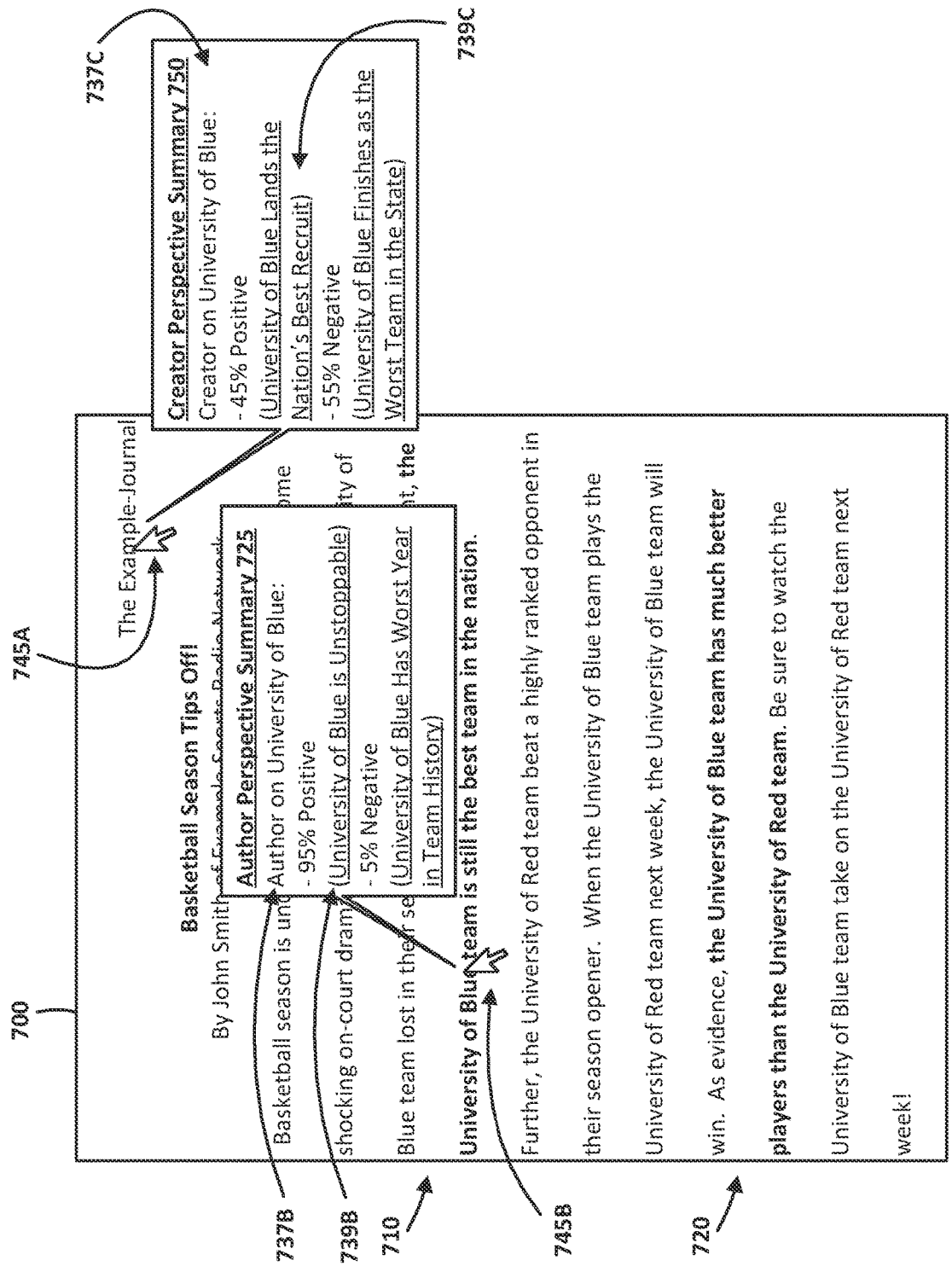
FIG. 7B illustrates another example interface that includes a bias summary.

In some implementations, the source perspective summary and/or additional content can be rendered in a separate interface from the target electronic document. For example, referring to FIG. 7B, the same target electronic document as illustrated in FIG. 7A (i.e., target electronic document 700) is rendered without the additional interface 705. Further, the target electronic document 700 is also rendered as a collated version of the target electronic document 700 having a creator of "The Example-Journal". As illustrated, a cursor 745A is hovering over the creator "The Example-Journal", and a Creator Perspective Summary 750 is rendered as a pop-up window upon hovering over (or selecting) the creator The Example-Journal. In comparison to the source perspective summaries of FIG. 7A, the Creator Perspective Summary 750 of FIG. 7B only includes creator perspective metrics 737C (e.g., shown as creator perspective percentages in FIG. 7B) that indicate 45% of documents collated by The Example-Journal, social media posts shared/liked by a social media account associated with The Example-Journal, and/or other features of additional resources related to the source perspective portions 710 and 720 portray the University of Blue basketball team in a positive manner, whereas 55% portray the University of Blue basketball team in a negative manner. Further, the creator perspective metrics 737C can be rendered along with corresponding hyperlinked text 739C. As shown in FIG. 7B, the hyperlinked text 739C enables a user to navigate to additional resources utilized in generating the creator perspective metrics 737C for The Example Journal's positive portrayal of University of Blue (e.g., a news article titled "University of Blue Lands the Nation's Best Recruit") and for The Example-Journal's negative portrayal of University of Blue (e.g., another news article titled "University of Blue Finishes as the Worst Team in the State"). Although the corresponding hyperlinked text 739C is depicted as hyperlinked text to a single additional resource for each of the creator perspective metrics 737C, it should be understood that is for exemplary purposes and is not meant to be limiting. For example, the corresponding hyperlinked text 739C can also be rendered with a selectable interface element that, when selected, enables a user consuming the target electronic document 700 to view more of the additional resources utilized in generating the creator perspective metrics 737C. Similarly, a cursor 745B is hovering over the first source perspective portion 710, and the Author Perspective Summary 715 is rendered as a pop-up window upon hovering over (or selecting) the first source perspective portion 710. In comparison to the Author Perspective Summary 725 of FIG. 7A, the Author Perspective Summary 725 of FIG. 7B only includes the author perspective metrics 737B (e.g., shown as author perspective percentages in FIG. 7B) and the corresponding hyperlinked text 739B.

Although FIG. 7B is depicted as only including the Author Perspective Summary 725 and the Creator Perspective Summary 750, it should be understood that is for exemplary purposes and not meant to be limiting. For example, upon hovering over (or selecting) the publisher Example Sports Radio Network, the Publisher Perspective Summary 715 can be rendered as a pop-up window. Moreover, although the Author Publisher Summary 725 and the Creator Perspective Summary 750 of FIG. 7B are depicted as including only source perspective percentages and related links, it should be understood that the Author Perspective Summary 725 and/or the Creator Perspective Summary 750 can also include one of a natural language explanations, other source perspective metrics, other links and/or listings of links, and/or any combination thereof to inform the user consuming the target electronic document of potential perspectives and explanations for the potential perspectives included in the target electronic document 700 and/or potential perspectives of a publisher and/or creator of the target electronic document 700.

In some additional and/or alternative implementations, a user can select other content of the target electronic document 700 that is in addition to the source perspective portions 710 and 720 (e.g., via clicking, highlighting, underlining, or otherwise selecting). In some versions of those implementations, a user interface element can be rendered along with the target electronic document 700 in response to the user selecting the other content, and the user interface element, when selected, can cause a source perspective identification engine to analyze the selected other content. In some further versions of those implementations, the selected other content can be analyzed to determine whether the selected other content potentially includes a perspective that is associated with an author, publisher, and/or creator of the target electronic document 700 and that is related to the selected other content (e.g., using source perspective identification engine 115) and/or to determine whether there is additional document(s) that explain any source perspective included in the selected other content (e.g., using additional resource scorer 125). If the selected other content includes a source perspective and/or the source perspective can be explained, another source perspective summary can be rendered via additional content interface 705 and/or via a new interface (e.g., the pop-up window of FIG. 7B), and/or one or more of the rendered source perspective summaries can be updated. Additionally or alternatively, the user selection of the other content of the target electronic document 700 can be used as a training instance for updating one or more machine learning models (e.g., the machine learning model utilized by perspective identification engine 115 and/or the machine learning model utilized by additional resource scorer 125 described with respect to FIG. 1). For example, if a user highlights other content of "When the University of Blue team plays the University of Red team next week, the University of Blue team will win" and if this other content is determined to potentially include a subjective perspective of the author John Smith, then the Author Perspective Summary 715 can be rendered via the additional content interface 705 and/or updated based on the selected additional content. Further, the Author Perspective Summary 715 can include links to additional documents that explain any source perspective included in the selected other content. In this manner, the user can flag portion(s) of the target electronic document 700 that potentially include source perspective(s) that was not previously identified as including source perspective(s).

In various implementations, if a target electronic document includes quote(s) and/or content that is collated by a creator, then the target electronic document can be analyzed (e.g., using source perspective identification engine 115) to determine whether the quote(s) and/or the content that is collated by the creator misrepresent original content from an original source. Further, the original content from the original source can also be identified. In some versions of those implementations, a source perspective summary can also include an indication of any content that is misrepresented in the target electronic document. For example, if The Example-Journal, the creator of the target electronic document 700 in FIG. 7B, included a quote from the coach of the University of Blue team in the target electronic document 700 that stated, "I think we have a chance to win the game if we rebound well", but the University of Blue coach actually stated, "We will win the game if we rebound well", then this misrepresentation can be included in the Creator Perspective Summary 750 of FIG. 7B. Although the misrepresentation in this example may seem negligible, it may portray the coach of the University of Blue team in a more likeable and/or respectable manner than that conveyed by the actual statement of the coach, and it may be illustrative of the creator's subjective perspective on the University of Blue team. In some further versions of those implementations, the additional content interface 705 can also include a source perspective summary for an original source of the quote. For example, the additional content interface 705 may also include a bias summary for the University of Blue coach as the original author of the quote.

In various implementations, an additional content renderer (e.g., additional content renderer 130 of FIG. 1) can be implemented (in whole or in part) by a corresponding one of application(s) (e.g., application(s) 107 of FIG. 1), can be installed as an extension of a corresponding one of the application(s), and/or can interface (e.g., via an API) with a corresponding one of the application(s). In response to accessing a given target electronic document via one of the application(s), the additional content renderer can access one or more databases (e.g., database 112 of FIG. 1) to determine whether the given target electronic document includes an entry in one or more of the databases. For example, one or more of the databases can include an index of the entries based on URLs and/or other identifiers, and the additional content renderer can search the index to determine whether an entry is present for the given target electronic document. If so, the additional content renderer can modify rendering of the given target electronic document, utilizing one or more techniques described herein. For example, the entry can include an indication of the source perspective portion(s) of the given electronic document, and such an indication utilized by the additional content renderer to alter those source perspective portions such that they are highlighted, bolded, or otherwise demarcate as a queue to the user that they may potentially include a source perspective. Also, for example, the entry can include an indication of additional content related to the source perspective portion(s) of the given electronic document, and the additional content renderer can cause the additional content to be automatically rendered, or cause it to be rendered in response to certain user input (e.g., a selection or hovering over a source perspective portion). The additional content rendered can modify the rendering of the target electronic document to cause rendering of the additional content and/or can monitor for certain user input and cause the rendering to occur in response to the certain user input.

In various implementations, an additional content determination engine (e.g., additional content determination engine 135 of FIG. 1) can utilize one or more de-duping techniques to ensure the source perspective summary more accurately reflects actual source perspective of at least one source of a target electronic document. The additional content determination engine can compare features of the additional resources, and can refrain from including, in determining the source perspective metric(s), certain additional resources that are duplicative of other additional resources, thereby resulting in a subset of the identified additional resources. For example, if a publisher publishes a news article on a web site associated with the publisher and then shares a link on a social media account associated with the publisher along with a quote from the news article, then only content of the original publication of the news article will be included in determining the source perspective metric(s) for the publisher. In contrast, if the publisher shares the link on the social media account associated with the publisher along with additional content that is not included in the news article (e.g., "the University of Blue team is also the best defensive team in the nation"), then both the content of the original publication of the news article and the additional content of the social media post will be included in determining the source perspective metric(s) for the publisher. Further, if an author that penned the news article shares the link from the social media account associated with the publisher along with additional content that is not included in the news article (e.g., "the University of Blue team is also the best offensive team in the nation"), then both the content of the news article and the additional content of the social media post will be included in determining the source perspective metric(s) for the author, but not in determining source perspective metric(s) the publisher. By using these de-duping techniques, the source perspective summary can more accurately reflect actual perspectives of the at least one source of the target electronic document since corresponding source perspective metric(s) are not skewed by duplicative resources.

In various implementations, the additional content determination engine can utilize a graph neural network to identify additional resources related to source perspective portions of a target electronic document. Further, an additional resource scorer (e.g., additional resource scorer 125 of FIG. 1) can also utilize the graph neural network to determine relatedness scores that are indicative of relatedness between a given one of the identified additional resources (or a portion of the additional resources) and a target electronic document. A knowledge graph can include various nodes, such as author nodes, publisher nodes, creator nodes, and/or resource nodes, and edges connecting each of the nodes can define relationships between these various nodes. For example, an author node of "John Smith" can be connected to a resource node of "Basketball Season Tips Off!" by an "authored" edge; a publisher node of "Example Sports Radio Network" can be connected to the resource node of "Basketball Season Tips Off!" by a "published" edge; a creator node of "The Example-Journal" can be connected to the resource node of "Basketball Season Tips Off!" by a "created" edge; and so on. The knowledge graph can also include various edges related to social media interactions. For example, if an author (e.g., John Smith) shares a news article (e.g., "University of Blue team favorite to win national championship"), then the author node associated with the author (e.g., author node "John Smith") can be connected a resource node associated with the news article (e.g., resource node "University of Blue team favorite to win national championship") by a "shared" edge.

Further, in some of those implementations, the knowledge graph can be iteratively applied as input across a graph neural network to generate one or more vectors that represent the nodes and/or edges of the knowledge graph. At each iteration, the vector that represents the nodes and/or edges can then be compared to the knowledge graph. Based on this comparison, the graph neural network embeds, in each of the nodes of the knowledge graph, information about neighboring nodes in the knowledge graph. Further, upon each iteration, each of the nodes is embedded with information about the neighboring nodes' neighboring nodes such that information about each node is propagated across the knowledge graph. Accordingly, each of the nodes of the knowledge graph are embedded with information about each of the other nodes of the knowledge graph by iteratively applying the knowledge graph with the embedded nodes as input across the graph neural network. For example, assume a knowledge graph includes an author node that is connected to both a publisher node and a creator node, but that the publisher node and the creator node are not connected. Further assume that the knowledge graph is applied as input across a graph neural network to generate a vector that represents the author node, the publisher node, the creator node, and/or corresponding edges between these nodes in the knowledge graph. In this example, the author node would be embedded with information from both the publisher node and the creator node, but both the publisher node and the creator node would only be embedded with information from the author node. However, by subsequently applying the knowledge graph with the embedded nodes as input across the graph neural network, the publisher node can be embedded with information from the creator node via the embedded author node, and the creator node can be embedded with information from the publisher node via the embedded author node. In this manner, additional resources related to source perspective portions of a target electronic document can be identified for use in generating source perspective summaries for at least one source of the target electronic document.

Moreover, in some of those implementations, the additional resource scorer can determine relatedness scores for each of the identified additional resources based on the information embedded in each of the nodes of the knowledge graph. For example, the information embedded in a node can include an index of content included in each of the other nodes. This allows the additional content determination engine to quickly identify additional resources that are related to source perspective portions of a target electronic document without having to traverse edges of the knowledge graph to identify the additional resources. Further, this allows the additional resource scorer to determine the relatedness scores for some additional resources for a given source perspective portion of a target electronic document prior receiving any indication to view one or more source perspective summaries from a user consuming the target electronic document.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
    identifying a target electronic document;
    processing the target electronic document to determine a source perspective portion of the target electronic document, wherein the source perspective portion of the target electronic document corresponds to a biased portion of the target electronic document;

identifying at least one source of the target electronic document;

searching, based on identifying the at least one source of the target electronic document, one or more corpuses;

identifying, based on the searching and from among a plurality of additional resources, at least a first additional resource and a second additional resource that are explanatory of the source perspective portion of the target electronic document;

generating, based on at least first content of the first additional resource and second content of the second additional resource, a source perspective summary for the at least one source, wherein the source perspective summary for the at least one source includes:

a natural language explanation of the biased portion of the target electronic document with respect to the at least one source that is determined based on first text from the first additional resource and second text from the second additional resource; and subsequent to generating the source perspective summary for the at least one source:

causing a computing device that is rendering the target electronic document to render the source perspective summary for the at least one source simultaneous with the rendering of the target electronic document at the computing device.

2. The method of claim 1, wherein the at least one source includes an author that penned the target electronic document, and wherein the source perspective summary includes an author perspective summary.

3. The method of claim 2, wherein the at least one source further includes a creator that collated the target electronic document, and wherein the source perspective summary further includes a separate creator perspective summary.

4. The method of claim 2, wherein the at least one source further includes a publisher that published the target electronic document, and wherein the source perspective summary further includes a separate publisher perspective summary.

5. The method of claim 2, at least the first additional resource and the second additional resource that are explanatory of the source perspective portion of the target electronic document include other documents penned by the author, social media posts of a social media account associated with the author, or social media interactions of the social media account associated with the author.

6. The method of claim 1, wherein the at least one source includes a publisher that published the target electronic document, and wherein the source perspective summary includes a separate publisher perspective summary.

7. The method of claim 6, wherein the at least one source further includes an author that penned the target electronic document, and wherein the source perspective summary further includes an author perspective summary.

8. The method of claim 6, wherein the at least one source further includes a creator that collated the target electronic document, and wherein the source perspective summary further includes a separate creator perspective summary.

9. The method of claim 1, wherein the source perspective summary for the at least one source further includes a corresponding link to each of the first additional resource and the second additional resource.

10. The method of claim 9, wherein the source perspective summary for the at least one source further includes at least one source perspective metric with respect to the biased portion of the target electronic document with respect to the at least one source that is determined based on at least the first text from the first additional resource and the second text from the second additional resource.

11. The method of claim 1, wherein the source perspective summary for the at least one source only includes at least one source perspective metric with respect to the biased portion of the target electronic document with respect to the at least one source that is determined based on at least the first text from the first additional resource and the second text from the second additional resource.

12. The method of claim 11, wherein the source perspective summary for the at least one source further includes a corresponding link to each of the first additional resource and the second additional resource.

13. A system comprising:

at least one processor; and memory storing instructions that, when executed, cause the at least one processor to:

identify a target electronic document;

process the target electronic document to determine a source perspective portion of the target electronic document, wherein the source perspective portion of the target electronic document corresponds to a biased portion of the target electronic document;

identify at least one source of the target electronic document;

search, based on identifying the at least one source of the target electronic document, one or more corpuses;

identify, based on the searching and from among a plurality of additional resources, at least a first additional resource and a second additional resource that are explanatory of the source perspective portion of the target electronic document;

generate, based on at least first content of the first additional resource and second content of the second additional resource, a source perspective summary for the at least one source, wherein the source perspective summary for the at least one source includes:

a natural language explanation of the biased portion of the target electronic document with respect to the at least one source that is determined based on first text from the first additional resource and second text from the second additional resource; and subsequent to generating the source perspective summary for the at least one source:

cause a computing device that is rendering the target electronic document to render the source perspective summary for the at least one source simultaneous with the rendering of the target electronic document at the computing device.

14. The system of claim 13, wherein the source perspective summary for the at least one source further includes:

at least one source perspective metric with respect to the biased portion of the target electronic document with respect to the at least one source that is determined based on at least the first text from the first additional resource and the second text from the second additional resource, and/or a corresponding link to each of the first additional resource and the second additional resource.

15. The system of claim 13,
wherein the source perspective summary includes an author perspective summary for an author that penned the target electronic document,
wherein the source perspective summary includes a creator perspective summary for a creator that collated the target electronic document, and/or
wherein the source perspective summary further includes a publisher perspective summary for a publisher that published the target electronic document.

16. A method implemented by one or more processors, the method comprising:
identifying a target electronic document;
processing the target electronic document to determine a source perspective portion of the target electronic document, wherein the source perspective portion of the target electronic document corresponds to a biased portion of the target electronic document;
identifying at least one source of the target electronic document;
searching, based on identifying the at least one source of the target electronic document, one or more corpuses;
identifying, based on the searching and from among a plurality of additional resources, at least a first additional resource and a second additional resource that are explanatory of the source perspective portion of the target electronic document;
generating, based on at least first content of the first additional resource and second content of the second additional resource, a source perspective summary for the at least one source, wherein the source perspective summary for the at least one source includes:
at least one source perspective metric with respect to the biased portion of the target electronic document with respect to the at least one source that is determined based on at least a first text from the first additional resource and a second text from the second additional resource; and
subsequent to generating the source perspective summary for the at least one source:
causing a computing device that is rendering the target electronic document to render the source perspective summary for the at least one source simultaneous with the rendering of the target electronic document at the computing device.

17. The method of claim 16, wherein the source perspective summary for the at least one source further includes:
a natural language explanation of the biased portion of the target electronic document with respect to the at least one source that is determined based on first text from the first additional resource and second text from the second additional resource, and/or
a corresponding link to each of the first additional resource and the second additional resource.

18. The method of claim 16,
wherein the source perspective summary includes an author perspective summary for an author that penned the target electronic document,
wherein the source perspective summary includes a creator perspective summary for a creator that collated the target electronic document, and/or
wherein the source perspective summary includes a publisher perspective summary for a publisher that published the target electronic document.

19. A system comprising:
at least one processor; and
memory storing instructions that, when executed, cause the at least one processor to:
identify a target electronic document;
process the target electronic document to determine a source perspective portion of the target electronic document, wherein the source perspective portion of the target electronic document corresponds to a biased portion of the target electronic document;
identify at least one source of the target electronic document;
search, based on identifying the at least one source of the target electronic document, one or more corpuses;
identify, based on the searching and from among a plurality of additional resources, at least a first additional resource and a second additional resource that are explanatory of the source perspective portion of the target electronic document;
generate, based on at least first content of the first additional resource and second content of the second additional resource, a source perspective summary for the at least one source, wherein the source perspective summary for the at least one source includes:
at least one source perspective metric with respect to the biased portion of the target electronic document with respect to the at least one source that is determined based on at least a first text from the first additional resource and a second text from the second additional resource; and
subsequent to generating the source perspective summary for the at least one source:
cause a computing device that is rendering the target electronic document to render the source perspective summary for the at least one source simultaneous with the rendering of the target electronic document at the computing device.

20. The system of claim 19, wherein the source perspective summary for the at least one source further includes:
a natural language explanation of the biased portion of the target electronic document with respect to the at least one source that is determined based on first text from the first additional resource and second text from the second additional resource, and/or
a corresponding link to each of the first additional resource and the second additional resource.

21. The system of claim 19,
wherein the source perspective summary includes an author perspective summary for an author that penned the target electronic document,
wherein the source perspective summary includes a creator perspective summary for a creator that collated the target electronic document, and/or
wherein the source perspective summary includes a publisher perspective summary for a publisher that published the target electronic document.

* * * * *